(12) United States Patent
Lee et al.

(10) Patent No.: US 9,160,398 B2
(45) Date of Patent: Oct. 13, 2015

(54) METHOD AND APPARATUS FOR TRANSMITTING SPARSE SIGNAL, AND METHOD AND APPARATUS FOR RECOVERING SPARSE SIGNAL VIA BELIEF PROPAGATION AND BAYESIAN HYPOTHESIS TEST

(75) Inventors: Heung-No Lee, Gwangju (KR); Kiseon Kim, Gwangju (KR); Jaewook Kang, Gwangju (KR)

(73) Assignee: GWANGJU INSTITUTE OF SCIENCE AND TECHNOLOGY, Buk-Su, Gwangju (KR)

( * ) Notice: Subject to any disclaimer, the term of this patent is extended or adjusted under 35 U.S.C. 154(b) by 291 days.

(21) Appl. No.: 13/420,176

(22) Filed: Mar. 14, 2012

(65) Prior Publication Data
US 2013/0036084 A1 Feb. 7, 2013

(30) Foreign Application Priority Data
Aug. 4, 2011 (KR) .................. 10-2011-0077836

(51) Int. Cl.
G06N 5/00 (2006.01)
H04B 1/66 (2006.01)
(52) U.S. Cl.
CPC ... *H04B 1/66* (2013.01); *G06N 5/00* (2013.01)
(58) Field of Classification Search
CPC ................................................ G06F 17/30153
See application file for complete search history.

(56) References Cited

PUBLICATIONS

Duarte, Marco F., et al. "Distributed compressed sensing of jointly sparse signals." Asilomar Conf. Signals, Sys., Comput. 2005.*
Haupt, Jarvis, et al. "Compressed sensing for networked data." Signal Processing Magazine, IEEE 25.2 (2008): 92-101.*
He, Zaixing, Takahiro Ogawa, and Miki Haseyama. "The simplest measurement matrix for compressed sensing of natural images." Image Processing (ICIP), 2010 17th IEEE International Conference on. IEEE, 2010.*
Boufounos, Petros, Marco F. Duarte, and Richard G. Baraniuk. "Sparse signal reconstruction from noisy compressive measurements using cross validation." Statistical Signal Processing, 2007. SSP'07. IEEE/SP 14th Workshop on. IEEE, 2007.*
Zymnis, Argyrios, Stephen Boyd, and Emmanuel Candes. "Compressed sensing with quantized measurements." Signal Processing Letters, IEEE 17.2 (2010): 149-152.*

* cited by examiner

*Primary Examiner* — Kakali Chaki
*Assistant Examiner* — Kevin W Figueroa
(74) *Attorney, Agent, or Firm* — Nath, Goldberg & Meyer; Jerald L. Meyer

(57) ABSTRACT

Disclosed are a method and an apparatus for transmitting a sparse signal, and a method and an apparatus for recovering the sparse signal. The method for recovering a sparse signal by using a sparse signal recovering device that recovers a target signal from a received signal includes receiving a measurement signal with a noise signal from a sparse signal transmitting device which scans a target signal based on a measurement matrix, performing a mutual update procedure in which a likelihood probability is calculated by using a posterior probability of the target signal based on a relation between the target signal and the measurement signal, and the posterior probability is updated by using the likelihood probability, and recovering the target signal by performing maximum a posterior estimation for a final posterior probability output through the mutual update procedure.

23 Claims, 12 Drawing Sheets

METHOD AND APPARATUS FOR TRANSMITTING SPARSE SIGNAL, AND METHOD AND APPARATUS FOR RECOVERING SPARSE SIGNAL VIA BELIEF PROPAGATION AND BAYESIAN HYPOTHESIS TEST

CROSS-REFERENCE TO RELATED APPLICATION

This application claims the benefit under 35 U.S.C. §119 of Korean Patent Application No. 10-2011-0077836 filed on Aug. 4, 2011 in the Korean Intellectual Property Office, the entirety of which disclosure is incorporated herein by reference.

BACKGROUND OF THE INVENTION

1. Field of the Invention

The present invention relates to a method and an apparatus for transmitting a sparse signal, and a method and an apparatus for recovering the sparse signal via a belief propagation and a Bayesian hypothesis test (BHT).

2. Description of the Related Art

When a signal length of a sparse signal is N, the sparse signal includes K (N>>K) non-zero elements and (N−K) zero elements. A compressed sensing scheme is a signal compressing and processing scheme capable of significantly reducing an amount of information of the sparse signal.

A transmitter generates a measurement signal $\underline{y}$ obtained by compressing and sensing a target sparse signal $\underline{x}$ by using a sensing matrix $\Phi$ and transmits the measurement signal $\underline{y}$. A receiver finds the target sparse signal $\underline{x}$ having the minimum non-zero elements among infinite solutions satisfying $\underline{y}=\Phi\underline{x}$. A method for recovering such a sparse signal is simply expressed as shown in following equation. However, according to the method for recovering the sparse signal, since $_xC_K$ search operations are required in order to recover the target signal $\underline{x}$, complexity is exponentially increased if the values of N and K are increased.

$$\min_{\underline{x}}\|x\|_0 \text{ s.t. } \underline{y}=\Phi\underline{x} - [P0]$$

$$\|x\|_0 = \{\# \text{ of non-zero elements of } \underline{x}\}$$

Equation

In addition, as schemes for recovering compressed measurement signals, an OMP (Orthogonal Matching Pursuit) scheme, an StOMP (Stagewise Orthogonal Matching Pursuit) scheme, and a chain pursuit scheme have been used. However, the above schemes represent a low recovery success rate, or are applicable to very sparse signals.

SUMMARY OF THE INVENTION

An objective of the present invention is to provide an apparatus and a method for transmitting a sparse signal, and an apparatus and a method for recovering the sparse signal, in which a sparse target signal is compressed based on a sparse sensing matrix and transmitted, a likelihood probability and a posterior probability are iteratively updated via a belief propagation, and a solution, in which the updated posterior probability is maximized, is recovered as the sparse target signal.

Another objective of the present invention is to provide an apparatus and a method for recovering a sparse signal via a belief propagation and a Bayesian hypothesis test (BHT). In other words, the objective of the present invention is to provide an apparatus and a method for recovering a sparse signal, in which the recovering of the sparse signal is defined in terms of probability through a maximum a posterior (MAP) scheme, and the MAP scheme is performed by combination of a support set detection part and a signal value estimation part, so that the signal can be recovered.

In the following description, the support set of the signal refers to a set of indexes of non-zero elements selected from among signal elements.

In order to accomplish the objective according to one aspect of the present invention, there is provided a method of transmitting a sparse signal in a sparse signal transmitting device. The method includes receiving a target signal, compressing the target signal based on a sensing matrix having a zero element and a non-zero element, and transferring a compressed signal. The sensing matrix has a number of rows less than a number of columns.

In the compressing of the target signal based on the sensing matrix having the zero element and the non-zero element, the target signal may be measured based on the sensing matrix, so that a measurement signal having a length shorter than a length of the target signal may be output.

The sensing matrix may include a predetermine number of non-zero elements in each row.

According to another aspect of the present invention, there is provided a method for recovering a sparse signal by using a sparse signal recovering device that recovers a transmitted signal from a received signal. The method includes receiving a measurement signal from a sparse signal transmitting device which measures a target signal based on a measurement matrix and then transmits the target signal, performing a mutual update procedure in which a likelihood probability is calculated by using a posterior probability of the target signal based on a relation between the target signal and the measurement signal, and the posterior probability is updated by using the likelihood probability, and recovering the target signal by dividing the recovery process into a signal support set detection part and a signal value estimation part using a maximum a posterior probability acquired through the result of the mutual update procedure The measurement signal includes a noise signal. A support set of the signal refers to a set of indexes of non-zero elements among signal elements.

The support set of the signal is detected via a belief propagation and a Bayesian hypothesis test. In other words, the posterior probability of the signal is calculated by iteratively finding the likelihood probability and the posterior probability under the assumption that information about the prior probability is recognized via the belief propagation.

The support set of the signal is detected through the Bayesian hypothesis test based on the final posterior probability. Next, the signal value estimation part selects elements of a signal to be estimated based on the information about the support set detected in the prior part.

The signal values of the selected elements are estimated by a minimum mean square error estimator. Finally, the signal is recovered by combining the information about the support set and the estimated signal values.

In the performing of the mutual update procedure, the mutual update procedure may be iterated by a predetermined number of times, so that the posterior probability of the target signal is calculated.

In the performing of the mutual update procedure, the relation between the target signal and the measurement signal may be set based on the measurement matrix, and probability information corresponding to the target signal may be exchanged with probability information corresponding to the measurement signal related to the target signal, thereby performing the mutual update procedure.

In the performing of the mutual update procedure, the relation between the target signal and the measurement signal, which is generated by adding the noise to a signal transmitted from the sparse signal transmitting device, may be set as a constraint condition, and the likelihood probability satisfying the constraint condition may be calculated.

In the performing of the mutual update procedure, constraint probabilities, in which a plurality of measurement signal elements related to the target signal satisfy an appropriate condition of the constraint condition, may be calculated, and the likelihood probability may be calculated by multiplying the constraint probabilities together.

In the performing of the mutual update procedure, the final posterior probability may be calculated based on a prior probability of the target signal and the likelihood probability output as a result of the mutual update procedure.

According to still another aspect of the present invention, there is provided a method for recovering a sparse signal by using a sparse signal recovering device that recovers a target signal from a measurement signal with a noise signal. The method includes exchanging probability information of target signal elements with probability information of measurement signal elements related to the target signal elements by a predetermined number of times to update the probability information of the target and measurement signal elements, calculating final posterior probabilities based on the probability information of the measurement signal elements acquired from an exchange result and prior probabilities of the target signal elements, detecting a support set of a signal by using a final posterior probability, and estimating values of signal elements selected by using the support set through an MMSE estimator.

In the updating of the probability information, a procedure, in which the probability information of the target signal elements may be updated based on the probability information of the measurement signal elements related to the target signal elements, and the probability information of the measurement signal elements is updated based on the probability information of the target signal elements related to the measurement signal elements, may be iterated by a predetermined number of times.

In the updating of the probability information, first probability information to be transferred from a first target signal element to a plurality of measurement signal elements related to the first target signal element may be calculated based on probability information obtained from the measurement signal elements related to the first target element, second probability information to be applied to a plurality of target signal elements related to a first measurement signal element from the first measurement signal element may be calculated based on probability information of the measurement signal elements related to the first measurement element, and a mutual update procedure may be iterated while determining if a number of times of exchanging the probability information of the related target and measurement signal elements satisfies the predetermined number of times while exchanging the probability information of the related target and measurement signal elements.

The calculating of the first probability information to be transferred to the measurement signal elements related to the first target signal element may include calculating a first value by multiplying the probability information received from remaining measurement signal elements obtained by excluding the measurement signal element of the first probability information to be transferred from the measurement signal elements related to the first target signal element, calculating a second value by multiplying the first value by a prior probability of the first target signal element, and calculating the first probability information by normalizing the second value.

The calculating of the second probability information to be transferred to the target signal elements related to the first measurement signal element may include calculating a first value by performing circular convolution with respect to the probability information received from remaining target signal elements obtained by excluding the target signal element of the second probability information to be transferred from the measurement signal elements related to the first measurement signal element, calculating a second value by performing circular convolution with respect to the first value and statistical information of the measurement signal with the noise signal, and calculating the second probability information by normalizing the second value.

The circular convention may be preformed through Fast Fourier Transform.

In the updating of the probability information of the target and measurement signal elements, a relation between the target signal elements and the measurement signal elements may be determined based on a binary measurement matrix used to compress the target signal to the measurement signal.

In the calculating of the final posterior probabilities, likelihood probabilities may be calculated by multiplying probability information of measurement signal elements related to the target signal, and the final posterior probabilities may be calculated based on the likelihood probabilities and the prior probabilities.

The probability information of the target signal elements may be posterior probability information of the target signal elements, and the probability information of the measurement signal elements may be likelihood probability information related to the posterior probabilities of the target signal elements.

The probability information of the measurement signal elements may include constraint probabilities of the measurement signal elements satisfying a constraint condition, and the constraint condition may be a relation between the target signal and a received signal obtained by adding the noise signal to the measurement signal.

The support set of the signal is detected from the Bayesian hypothesis test based on the probability ratio obtained from the final posterior probability.

The probability ratio may be obtained from the final posterior probability by using a Bayesian rule.

The signal value estimation part selects elements of a signal to be estimated by using the support set of the signal detected from the Bayesian hypothesis test. Next, the values of the elements are calculated through the MMSE estimator.

The target signal is recovered by selectively combining the signal values estimated in the signal value estimation part and the information about the support set.

According to still another aspect of the present invention, there is provided an apparatus for transmitting a sparse signal, which compresses a sparse target signal and transmits the sparse target signal. The apparatus includes an input part to receive the sparse target signal, a compressive sensing part to measure and compress the sparse target signal based on a sensing matrix having a zero element and a non-zero element; and a transmitting part to transmit a compressed signal.

The compressive sensing part outputs a measurement signal obtained by sensing and compressing the sparse target signal by using the sensing matrix having a number of rows less than a number of columns.

According to still another aspect of the present invention, there is provided an apparatus for recovering a sparse signal which recovers a target signal from a received signal. The apparatus includes an input part to receive a signal including a measurement signal obtained by compressive-measurement the target signal, a probability updating part to update probability information of the target signal elements and probability information of the measurement signal elements by exchanging the probability information of the target signal elements with the probability information of the measurement signal elements by a predetermined number of times based on a relation between the target signal and the measurement signal, a maximum a posterior (MAP) estimation part to calculate final posterior probabilities of the target signal elements based on probability information of the measurement signal elements that is output as an update result, and prior probabilities of the target signal elements, and to recover the target signal by performing maximum a posterior estimation for the final posterior probabilities, a support detection part to detect a signal support set by using the posterior probabilities, a signal value estimation part to selectively estimate signal values by using the detected support set, and a combination part to recover a signal by combining the information about the support set and the estimated signal values.

The input part may receive a measurement signal obtained by compressive-sensing the target signal based on a sensing matrix.

The probability updating part may include a target signal probability updating part to update the probability information of the target signal element based on received probability information of the measurement signal element, and to calculate probability information to be transferred to a measurement signal element related to the target signal element, a measurement signal probability updating part to update the probability information of the measurement signal element based on the probability information received from the target signal probability updating part, and to calculate probability information to be transferred to a target signal element related to the measurement signal element, so that the probability information is transferred to the target signal probability updating part, and a counting part to calculate a number of times of exchanging probabilities between the target signal probability updating part and the measurement signal probability updating part, and to determine if the number of times of exchanging the probabilities reaches the predetermined number of times, so that updating for the probability information of the target and measurement signal elements is controlled.

The probability information of the target signal elements may be posterior probability information of the target signal elements, and the probability information of the measurement signal elements may be likelihood probability information related to posterior probabilities of the target signal elements.

The maximum a posterior estimation part may calculate likelihood probabilities by multiplying the probability information of the measurement signal elements related to the target signal, which is output as the update result, and the final posterior probabilities may be calculated based on the likelihood probabilities and the prior probabilities.

As described above, according to the embodiment of the present invention, since the sparse signal transmitting device compresses the target signal based on a sparse binary matrix, the sparse signal transmitting device can be readily realized in hardware, and can rapidly scan the target signal while compressing the target signal. In addition, according to the embodiment of the present invention, the sparse signal recovering device can recover a signal with the maximum probability according to a given measurement matrix and the sparsity of the target signal. The minimum length of the measurement signal required when the signal is recovered is slowly increased, so that low complexity is represented. In addition, the sparse signal recovering device represents a high signal recovery success rate, and can effectively remove a noise component added to a signal component by using the prior information about the target signal and the statistical information about the noise component.

DETAILED DESCRIPTION OF THE INVENTION

Figure 1:
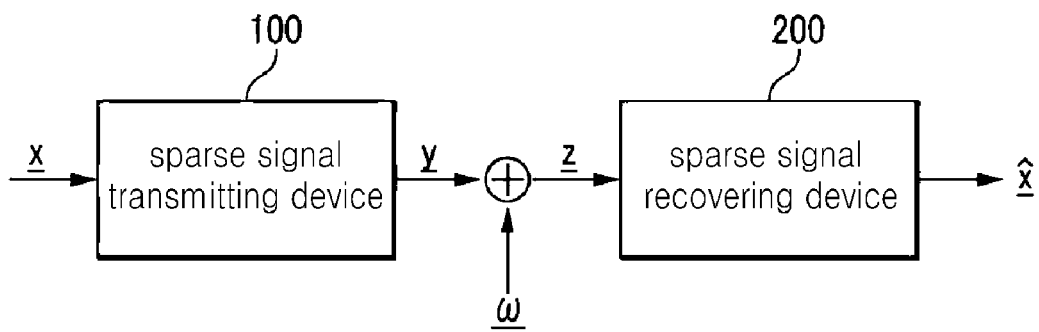
FIG. 1 is a sectional view schematically showing a compressive sensing system according to a first embodiment of the present invention.

Hereinafter, the embodiments of the present invention will be described in detail with reference to accompanying drawings so that the embodiments can be readily realized by those skilled in the art to which the present invention pertains. However, the present invention is not limited to the following embodiments but includes various applications and modifications. In addition, parts that are not related to the present invention are omitted from the accompanying drawings in order to make the present invention clear, and the similar reference numerals will be assigned to the similar components throughout the specification.

In the following description, when a predetermined part "includes" a predetermined component, the predetermined part does not exclude other components, but may further include other components unless otherwise indicated.

Hereinafter, an apparatus and a method for transmitting a sparse signal according to the embodiment of the present invention, and an apparatus and a method for recovering the sparse signal will be described in detail with reference to accompanying drawings.

FIG. 1 is a sectional view schematically showing a compressive sensing system according to a first embodiment of the present invention.

Referring to FIG. 1, the compressive sensing system includes a sparse signal transmitting device 100 and a sparse signal recovering device 200.

The sparse signal transmitting device 100 generates a measurement signal $\underline{y}$ by sensing a target signal $\underline{x}$ based on a sensing matrix $\Phi$ having a sparse characteristic. The target signal $\underline{x}$ is a sparse signal, and elements of the target signal $\underline{x}$ have non-zero values with predetermined probability q. In this case, the sensing matrix $\Phi$ is an M×N sensing matrix representing a sparse characteristic. Each element $\phi_{ji}$ of the sensing matrix $\Phi$ has a value of "0" or "1". The $\phi_{ji}$ represents a $(j,i)^{th}$ element of the sensing matrix $\Phi$.

The sparse signal transmitting device 100 senses the target signal $\underline{x}$ by projecting the target signal $\underline{x}$ to the sensing matrix $\Phi \in \{0,1\}^{M \times N}$. Since the sensing matrix $\Phi$ is an M×N matrix having the number M of rows less than the number N of columns, if the sparse signal transmitting device 100 senses the target signal $\underline{x}$ by using the sensing matrix $\Phi$, the measurement signal $\underline{y} = \Phi \underline{x}$ is generated by simultaneously sensing and compressing the target signal $\underline{x}$. Therefore, the sensing based on the sensing matrix $\Phi$ is regarded as compressed sensing, and the measurement signal refers to a compressed measurement signal.

In the sensing matrix $\Phi$, the number of elements having the value of "1" in an $j^{th}$ row is fixed to $L_j$ elements, and the position of the element having the value of "1" instead of the value of "0" in each row is selected among N positions with uniform probability of 1/N. Since each sensing matrix element $\phi_{ji}$ mostly has the value of "0", the sensing matrix $\Phi$ has an advantage in realization in hardware, and allows the rapid sensing and the compression of a signal.

The sparse signal recovering device 200 recovers the target signal $\underline{x}$, which has been transmitted after the compressive sensing operation by the sparse signal transmitting device 100, based on an input signal $\underline{z}$. In this case, the input signal $\underline{z}$ is obtained by adding a noise signal $\underline{w}$ to the measurement signal $\underline{y}$ generated from the sparse signal transmitting device 100. The input signal $\underline{z}$ is regarded as a measurement signal in the sparse signal recovering device 200. The noise signal $\underline{w}$ may include received noise added in a wireless channel environment and quantization noise added in the quantization step.

The sparse signal recovering device 200 recovers a target signal through a target signal through MAP (maximum a posterior) estimation. According to the MAP estimation, a value $\underline{x}$, which is obtained when a posterior probability $[P_X(\underline{x}|\underline{z},\underline{c})]$ of the target signal $\underline{x}$ is maximized, is estimated as a target signal, and expressed as shown in Equation 1. In Equation 1, $\underline{c}$ is a constraint condition of a signal to be estimated, and the value of $\underline{c} = \|\Phi\underline{x} - \underline{z}\|_2$ must be smaller than a specific allowance value $\in$.

$$\hat{\underline{x}} = \arg\max p_X(\underline{x}|\underline{z},\underline{c}) s \cdot t \|\Phi\underline{x} - \underline{z}\|_2 \le \in \qquad \text{Equation 1}$$

The sparse signal recovering device 200 uses a Bayesian rule in order to find out a target signal through the MAP estimation. According to the Bayesian rule, the posterior probability $[p_X(\underline{x}|\underline{z},\underline{c})]$ related to the target signal is expressed by a likelihood probability $[\Pr(\underline{c},\underline{z}|x_i)]$ and a prior probability $[p_X(x_i)]$ as shown in Equation. 2. In Equation 2, $P_r(\underline{c},\underline{z})$ represents evidence probability. Since the evidence probability $P_r(\underline{c},\underline{z})$ is applied in common with respect to all elements, the evidence probability $P_r(\underline{c},\underline{z})$ is ignored in the MAP estimation.

$$p_X(x|c,z) = p_X(x) \times \frac{\Pr(c,z|x)}{p(c,z)} \qquad \text{Equation 2}$$

In addition, since elements $x_i$ of the target signal $\underline{x}$ are independent from each other, the posterior probability of each element $x_i$ may be independently estimated as shown in Equation. 3. In this case, a total index set of the target signal is $V = \{1, \ldots, N\}$ and the total index set of the measurement signal $\underline{y}$ is $C = \{1, \ldots, M\}$. In addition, $N_V(i)$ is an index set of measurement signal elements $z_{j \in N_V(i)}$ related to the target signal element $x_i$, and $N_C(j)$ is an index set of the target signal element $x_{i \in N_C(j)}$ related to the measurement signal element $z_j$. The $N_V(i)$ and the $N_C(j)$ are defined as shown in Equation 4. The relation between each target signal element $x_i$ and each measurement signal element $z_j$ is defined according to each sensing matrix element $\phi_{ji}$.

$$p_X(x_i|c_j,z_j) = \frac{p_X(x_i)}{p(c,z)} \times \prod_{j \in N_V(i)} \Pr(c_j, z_j | x_i) \qquad \text{Equation 3}$$

for $i = 1 \sim N$ $$N_V(i) := \{j \in C | \phi_{ji} = 1\} \subseteq C$$

$$N_C(j) := \{i \in V | \phi_{ji} = 1\} \subseteq V \qquad \text{Equation 4}$$

The sparse signal recovering device 200 gradually looks for the real value of the target signal while iteratively updating the likelihood probability and the posterior probability related to the target signal element $x_i$ and the measurement signal element $z_j$ via a belief propagation under the assumption that the prior probability $[p_X(x_i)]$ of the target signal has been recognized. Thereafter, the sparse signal recovering device 200 determines a signal, which is obtained when the final posterior probability $[p_X(x_i|\underline{z},\underline{c})]$ obtained as the result of the iterated update has a maximum value, as the target signal $$\hat{x}_i$$

through the MAP estimation of Equation 1.

Figure 2:
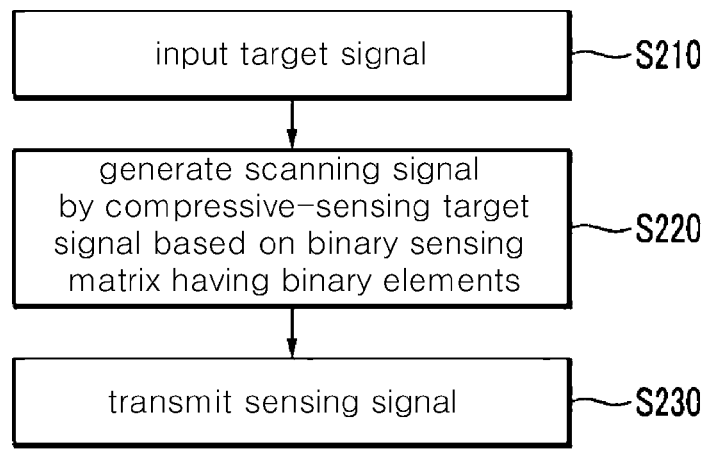
FIG. 2 is a flowchart showing a method for transmitting a sparse signal according to the first embodiment of the present invention.

FIG. 2 is a flowchart showing a method for transmitting the sparse signal according to the first embodiment of the present invention.

Referring to FIG. 2, the sparse signal transmitting device 100 receives the target signal $\underline{x}$ to be transmitted (step S210). The target signal $\underline{x}$ is a sparse signal having non-zero values with the sparsity rate of q. When a signal length of the target signal $\underline{x}$ is N, the target signal $\underline{x}$ is expressed as $\underline{x}=[x_1, \ldots, x_N] \in R^N$. In this case, the number of non-zero elements of the target signal $\underline{x}$ follows binominal distribution [B (N,q)]. It is assumed that values of non-zero elements follow predetermined probability distribution $[p_X(x_i|x_i \neq 0)]$, and the elements of the target signal $\underline{x}$ are iid (identically independently distributed). Therefore, the distribution of the target signal elements x, is defined as shown in Equation 5. In addition, the distribution of the target signal elements defined in Equation 5 is used as prior probability used to signal recovery.

$$p_X(x_i) = p_X(x_i | x_i \neq 0)q + \delta(x_i)(1-q) \quad \text{Equation 5}$$

$$\text{where} \begin{cases} X_i \sim p_X(x_i | x_i \neq 0), & \text{with } q \\ X_i = 0, & \text{with } 1-q \end{cases}$$

The sparse signal transmitting device 100 generates a measurement signal by performing compressive sensing for a target signal based on a sensing matrix having zero elements and non-zero elements (step S220). The sensing matrix $\Phi$ is an M×N matrix in which each element $\Phi_{ji}$ is a zero element or a non-zero element, and the number M of rows is less than the number N of columns. Therefore, if the sparse signal transmitting device 100 measures the target signal $\underline{x}$ by using the sensing matrix $\Phi$, a measurement signal having a length shorter than that of the target signal $\underline{x}$ is generated. In other words, the sparse signal transmitting device 100 generates the measurement signal $\underline{y}$ obtained by simultaneously sensing and compressing the target signal $\underline{x}$ through the sensing matrix $\Phi$.

The sparse signal transmitting device 100 transmits the measurement signal (step S230).

Figure 3:
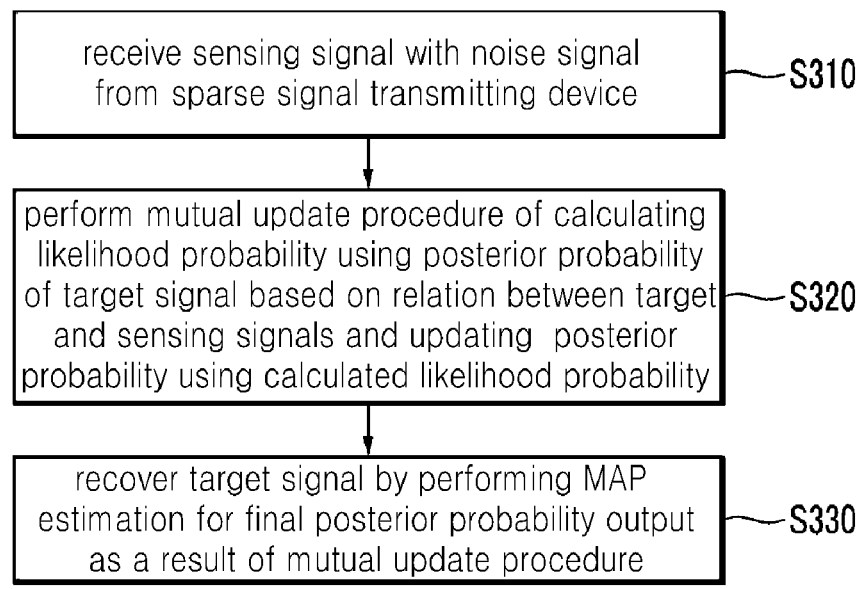
FIG. 3 is a flowchart showing a method for recovering a sparse signal according to the first embodiment of the present invention.

FIG. 3 is a flowchart showing a method for recovering the sparse signal according to the first embodiment of the present invention.

Referring to FIG. 3, the sparse signal recovering device 200 recovers a target signal from a received signal based on previously-known information. The sparse signal recovering device 200 previously recognizes statistical information $[p_W(w_j)]$ of the noise signal $\underline{w}$, the prior probability $[p_X(x_i)]$ of the target signal $\underline{x}$, and the sensing matrix $\Phi$ used for the compression of the target signal by the sparse signal transmitting device 100. The prior probability of the target signal is expressed as shown in Equation. 5.

The sparse signal recovering device 200 receives the measurement signal $\underline{z}$ which is generated by adding a noise signal to a signal transmitted from the sparse signal transmitting device 100 (step S310). In this case, the measurement signal $\underline{z}$ is a signal generated by adding the noise signal to a signal measured from the target signal based on a sensing matrix.

The sparse signal recovering device 200 performs a mutual update procedure in which a likelihood probability is calculated by using the posterior probability of the target signal based on the relation between a target signal and a measurement signal, and the posterior probability is updated by using the calculated likelihood probability (step S320). Referring to Equation 3, the sparse signal recovering device 200 sets the relation between a target signal and a measurement signal based on the measurement matrix $\Phi$, and exchanges probability information corresponding to the related target signal with probability information corresponding to the related measurement signal. In addition, the sparse signal recovering device 200 repeats the mutual update procedure by the predetermined number of times to update the probability information.

Hereinafter, the mutual update procedure will be described with reference to Equation 3. The likelihood probability $$\left[ \prod_{j \in N_V(i)} Pr(c_j, z_j | x_i) \right]$$

is obtained by multiplying the probabilities of measurement signal elements $z_{j \in N_V(i)}$, which are related to the target signal element $x_i$, that is, the measurement signal elements $z_{j \in N_V(i)}$, indexes of which belong to $N_v(i)$ together. In this case, the measurement signal elements $z_j$ must satisfy a constraint condition $$c_j = \sum_i \phi_{ji} x_i - (z_j + w_j) \leq \varepsilon$$

or a signal to be estimated. The constraint condition represents the relation between the target signal elements $x_i$ and the measurement signal elements $z_j$, which is generated by adding the noise signal elements $w_j$ to the signal elements $$y_j = \sum_i \phi_{ji} x_i$$

transmitted by the sparse signal transmitting device 100. Therefore, the probability $[Pr(c_j, z_j | x_i)]$ of the measurement signal element $z_j$ may be constraint probability of a $j^{th}$ element of the measurement signal $\underline{z}$. Accordingly, the sparse signal recovering device 200 calculates the constraint probability $[Pr(c_j, z_j | x_i)]$ of each of the measurement signal elements $z_{j \in N_V(i)}$ related to the target signal element $x_i$, and calculates a likelihood probability $$\left[ \prod_{j \in N_V(i)} Pr(c_j, z_j | x_i) \right]$$

by multiplying all constraint probabilities $[Pr(c_j, z_j | x_i)]$ of the measurement signal elements $z_{j \in N_V(i)}$ together.

As described above, since the likelihood probability $$\left[ \prod_{j \in N_V(i)} Pr(c_j, z_j | x_i) \right]$$

is calculated by using the constraint probabilities $[Pr(c_j, z_j | x_i)]$ of the measurement signal elements $z_{j \in N_V(i)}$ related to the target signal element $x_i$, the sparse signal recovering device 200 mutually updates appropriate probability information by iteratively finding probability information $[p_X(x_i | \underline{c}, \underline{z})]$ of the target signal element $x_i$ and probability information $[Pr(c_j, z_j | x_i)]$ of the measurement signal element $z_j$ related to the target signal element $x_i$. In other words, the sparse signal recovering device 200 repeats the update procedure by the predetermined number of times in which the probability information $[Pr(x_j, z_j | x_i)]$ of the target signal element $x_i$ is updated based on the probability information of the measurement signal element $z_{j \in N_V(i)}$ related to the target signal element $x_i$, and the probability information [$\Pr(c_j, z_j | x_i)$] of the measurement signal element $z_j$ is updated based on the probability information of the target signal element $x_{i \in N_C(j)}$ related to the measurement signal element z.

The sparse signal recovering device 200 recovers a target signal by performing MAP estimation with respect to the final posterior probability output through the mutual update procedure (step S330). Referring to Equation 3, the final posterior probability is calculated by multiplying the likelihood probability $$\left[ \prod_{j \in N_V(i)} \Pr(c_j, z_j | x_i) \right]$$

output through the mutual update procedure by the prior probability [$p_X(x_i)$] of the target signal $x_i$.

The sparse signal recovering device 200 determines a signal having the greatest probability value in the final posterior probability as shown in Equation 1.

Hereinafter, the mutual update procedure of the sparse signal recovering device 200, which is performed through the iterative exchange of probability information between the target signal element $x_i$ and the measurement signal elements $z_{j \in N_V(i)}$ related to the target signal element $x_i$, will be described.

Figure 4:
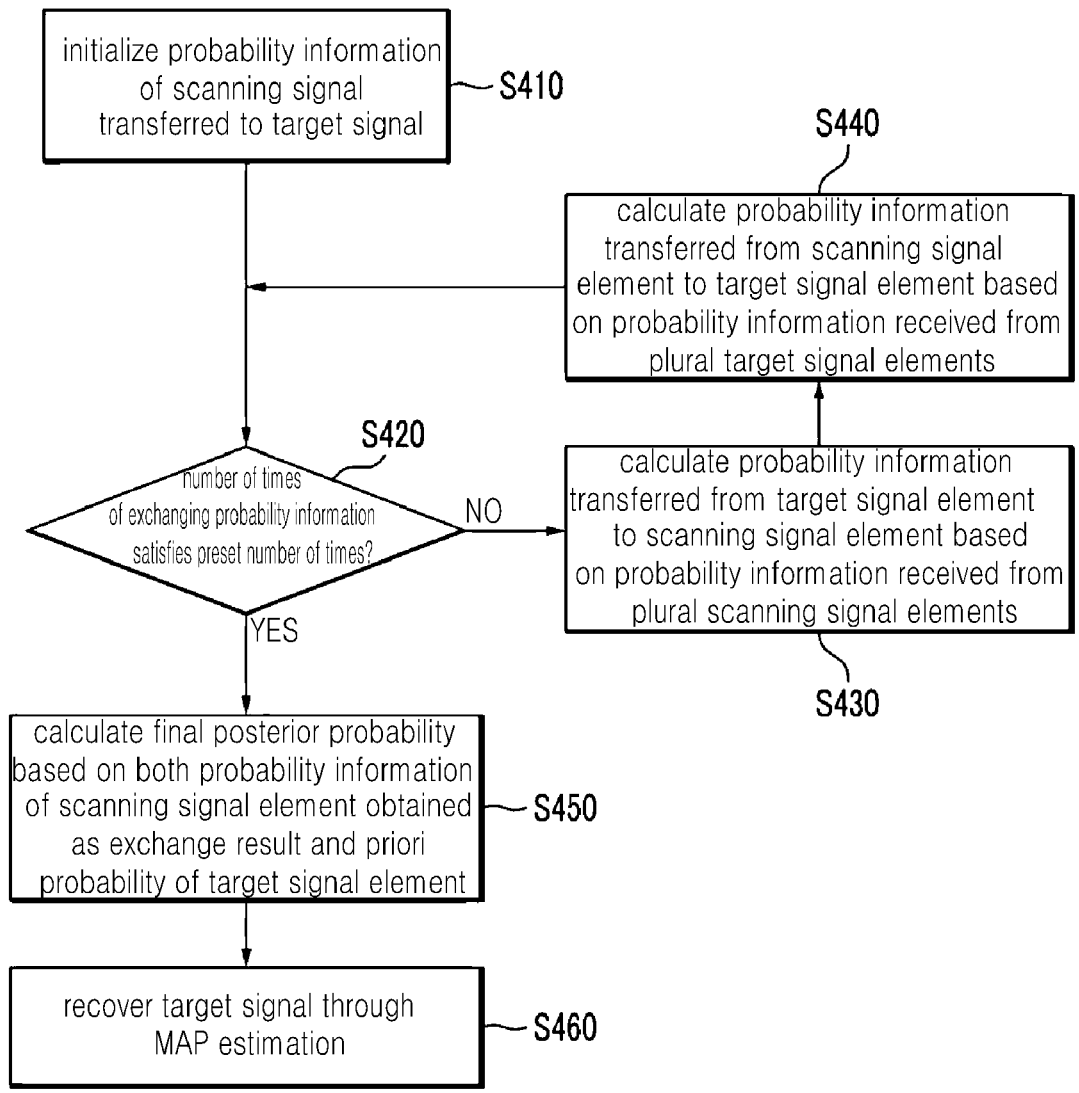
FIG. 4 is a flowchart showing a method for recovering a sparse signal according to a second embodiment of the present invention.

FIG. 4 is a flowchart showing the method for recovering the sparse signal according to a second embodiment of the present invention.

Referring to FIG. 4, the sparse signal recovering device 200 updates probability information $m_{i \rightarrow j}^l$ of a target signal element and probability information $m_{j \rightarrow i}^l$ of a measurement signal element, which are related to the target signal element, by exchanging the probability information of the target signal element and the probability information $m_{j \rightarrow i}^l$ of the measurement signal element by the predetermined number of times. The sparse signal recovering device 200 recovers the target signal by performing the MAP estimation based on the updated probability information.

The sparse signal recovering device 200 initializes the probability information of the measurement signal element $z_j$ transferred to the target signal element $x_i$ (step S410). In other words, the sparse signal recovering device 200 can initialize the probability information of the measurement signal element $z_j$, which is transferred to the target signal element $x_i$, to a value of "1" ($m_{j \rightarrow i}^{l=0}=1$) The probability information $m_{j \rightarrow i}^{l=0}$ represents initial probability information transferred from a $j^{th}$ element of the measurement signal to an $i^{th}$ element of the target signal in $0^{th}$ exchange, that is, in an initial state that probability information is not exchanged.

The sparse signal recovering device 200 determines if the number l of times of exchanging probability information of the target signal element $x_i$ and the probability information of the measurement signal element $z_j$, which are related to the target signal element $x_i$, satisfies the preset number $N_{iter}$ of times (step S420).

If the exchange number l of times does not satisfy the preset number $N_{iter}$ of times, the sparse signal recovering device 200 calculates the probability information $m_{i \rightarrow j}^l$ to be transferred from the target signal element $x_i$ to the measurement signal element $z_j$ based on the probability information $m_{k \rightarrow i}^{l-1}$ received from a plurality of the measurement signal elements $z_j$ related to the target signal element $x_i$ (step S430). The probability information $m_{i \rightarrow j}^l$ may be the posterior probability of the target signal, which is calculated except for the probability information of the measurement signal element to be transferred. In other words, the sparse signal recovering device 200 calculates the probability information $m_{i \rightarrow j}^l$ by multiplying prior probability by the probability information $m_{k \rightarrow i}^{l-1}$ received from remaining measurement signal elements $x_{j \in N_V(i):k \neq j}$ without the measurement signal element $z_j$ of the probability information to be transferred. The probability information $m_{i \rightarrow j}^l$ to be transferred to the measurement signal element $z_j$ from the target signal element $x_i$ is expressed as shown in Equation 6. In this case, the probability information $m_{i \rightarrow j}^l$ represents probability information transferred from an $i^{th}$ target signal element to a $j^{th}$ measurement signal element in $t^{th}$ exchange. In addition, $K_1^l$ is a constant used to normalize the probability information $m_{i \rightarrow j}^l$ in the $l^{th}$ exchange. $\Sigma m_{i \rightarrow j}^l$ is accomplished through the $K_1^l$, so that the probability information $m_{i \rightarrow j}^l$ becomes effective probability distribution. The $p_X(x_i)$ is prior probability of the target signal element $x_i$. In addition, in Equation 6, an operator "×" refers to the multiplication of an element by an element.

$$m_{i \rightarrow j}^l := K_1^l p_X(x_i) \times \prod_{k \in N_V(i), k \neq j} m_{k \rightarrow i}^{l-1} \qquad \text{Equation 6}$$

Figure 8:
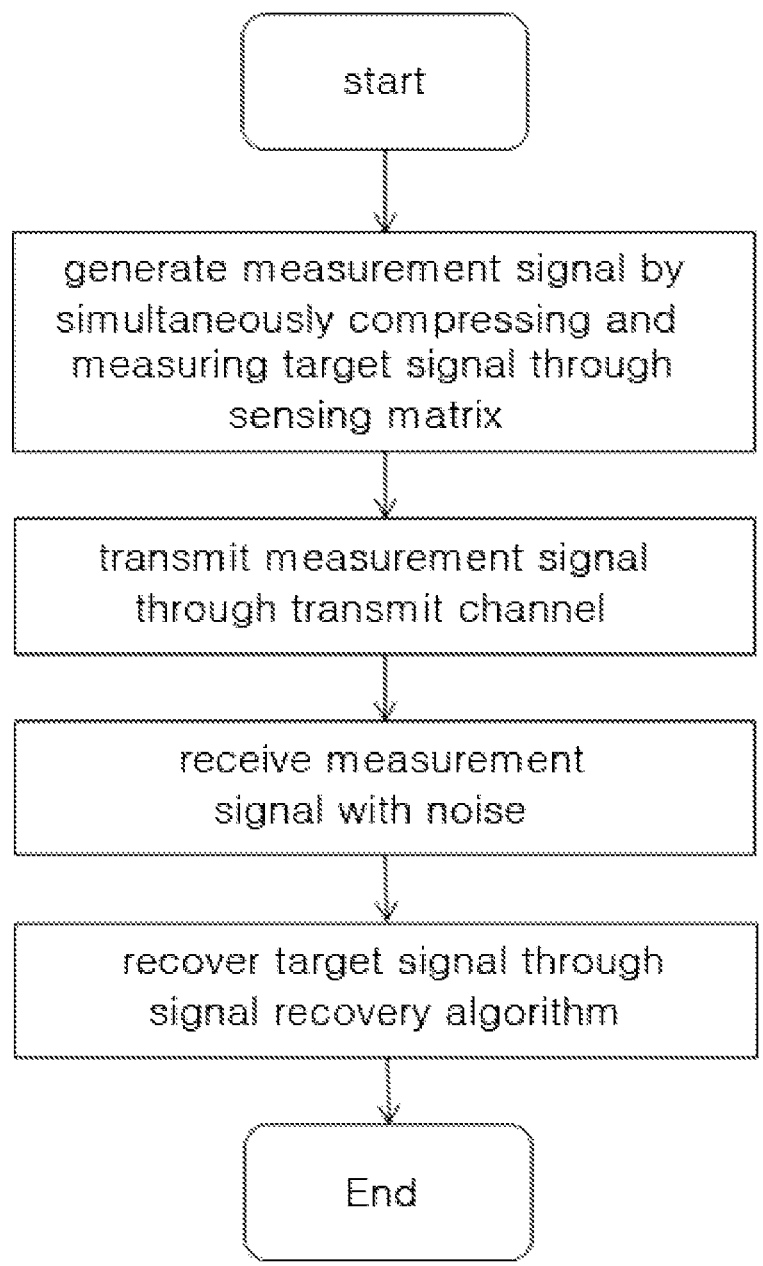
FIG. 8 is a flowchart showing a signal compressing procedure based on compressive sensing and a signal recovering procedure realized by the sparse signal recovering device of FIG. 7.
Figure 9:
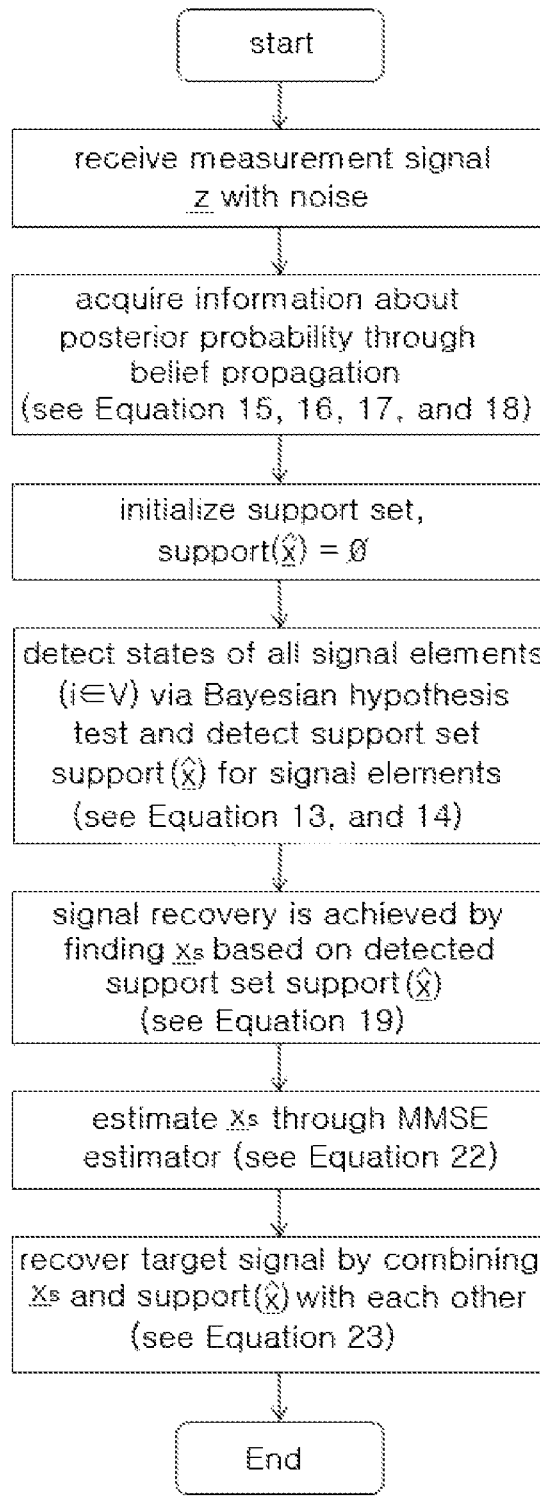
FIG. 9 is a flowchart showing the whole signal processing procedure of recovering a target signal, which is realized by the sparse signal recovering device of FIG. 7.
Figure 10:
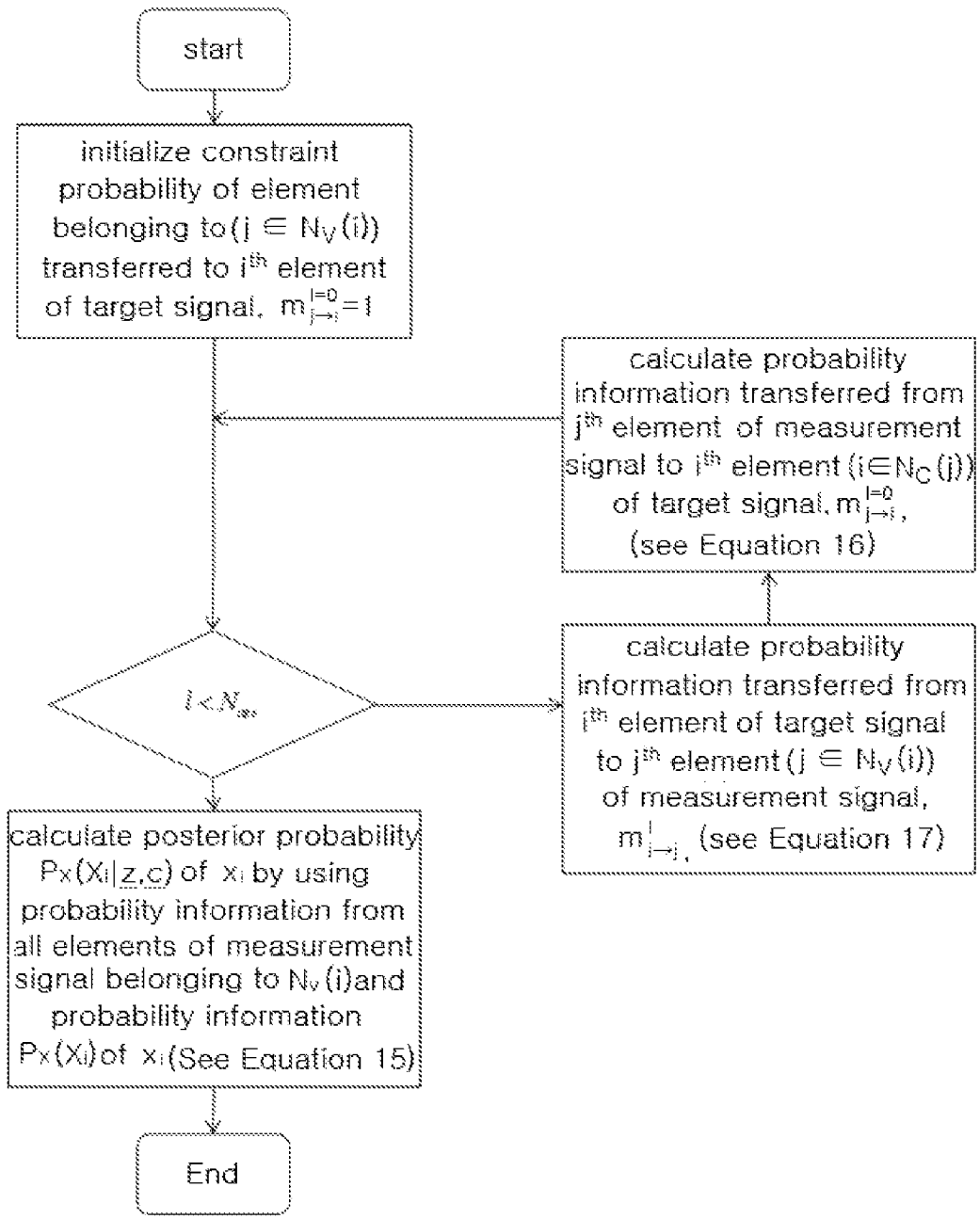
FIG. 10 is a flowchart showing a procedure of calculating a posterior probability $P_x(x_i|\underline{z})$ via a belief propagation of an $i^{th}$ element $x_i$ of the target signal, which is realized by the sparse signal recovering device of FIG. 7.
Figure 11:
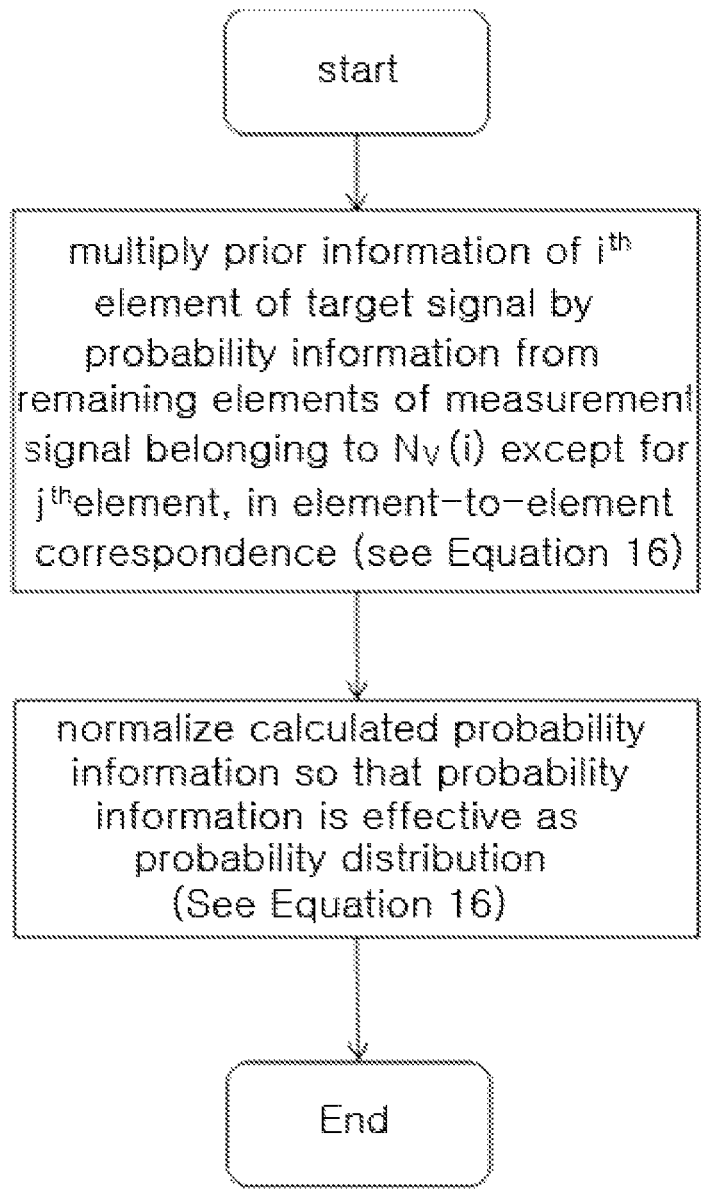
FIG. 11 is a flowchart showing a procedure of calculating probability information transferred to a $j^{th}$ element ($j \in N_r(i)$) of the measurement signal from the $i^{th}$ element of the target signal during $l^{th}$ repetition of the belief propagation in order to calculate a posterior probability, which is realized by the sparse signal recovering device of FIG. 7.
Figure 12:
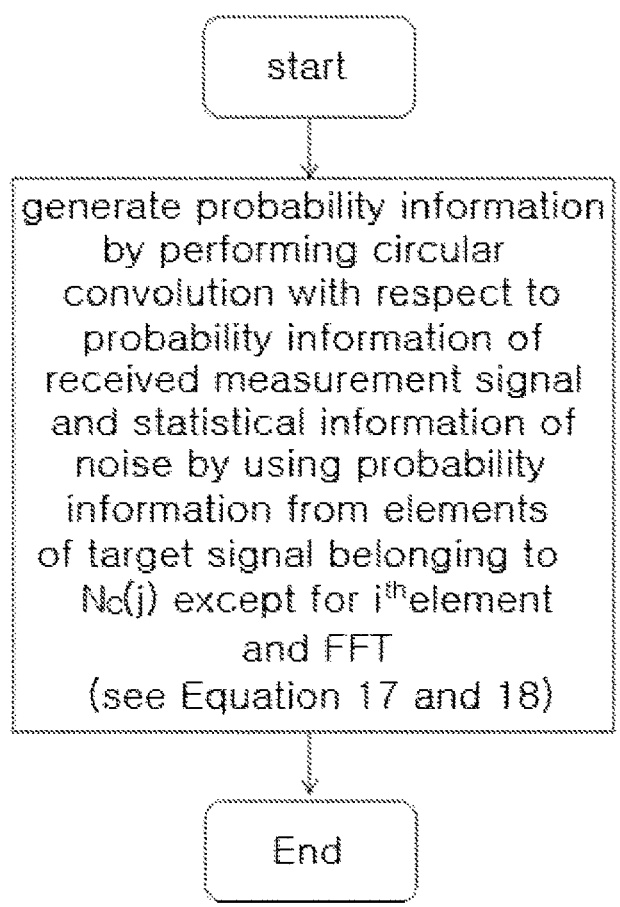
FIG. 12 is a flowchart showing a procedure of calculating probability information transferred from the $j^{th}$ element of the measurement signal to the $i^{th}$ element ($i \in N_c(j)$) of the target signal during $l^{th}$ repetition of the belief propagation in order to calculate a posterior probability, which is realized by the sparse signal recovering device of FIG. 7.
Figure 13:
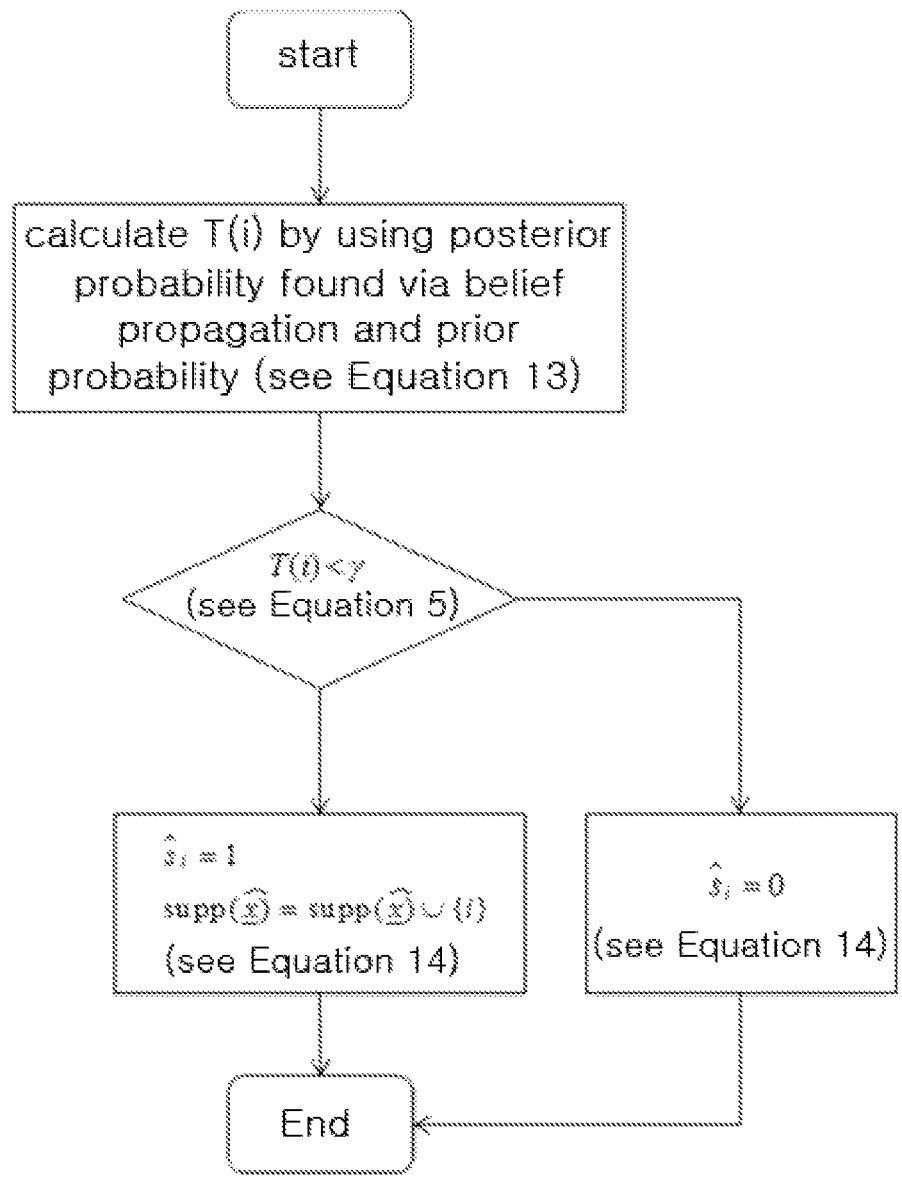
FIG. 13 is a flowchart showing a procedure of detecting the state $s_i$ of the $i^{th}$ element $x_i$ of the target signal by using the Bayesian hypothesis test, which is realized by the sparse signal recovering device of FIG. 7.
Figure 14:
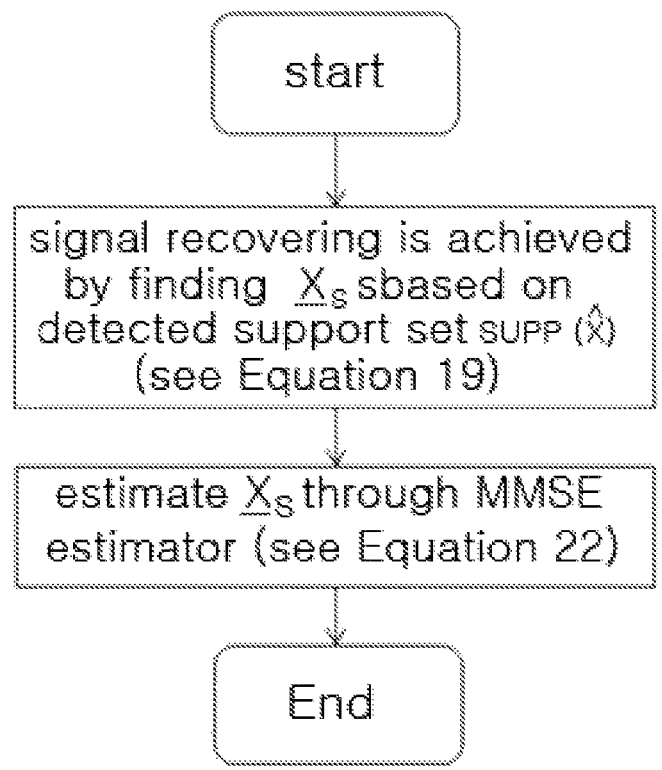
FIG. 14 is a flowchart showing a procedure of estimating one vector $\underline{x}_s$ including only signal elements belonging to the support set supp($\hat{x}$), which is realized by the sparse signal recovering device of FIG. 7.

The sparse signal recovering device 200 calculates the probability information $m_{j \rightarrow i}^l$ to be transferred from the measurement signal element $z_j$ to the target signal element $x_i$ based on the probability information received from a plurality of target signal elements related to the measurement signal elements $z_j$ (step S440). The probability information $m_{j \rightarrow i}^l$ is constraint probability of the measurement signal, which is calculated except for the probability information of the target signal element serving as the target of the transfer of the probability information. In other words, the sparse signal recovering device 200 calculates the probability information $m_{j \rightarrow i}^l$ by performing circular convolution with respect to statistical information about a measurement signal with a noise signal and probability information $m_{k \rightarrow j}^l$ received from remaining target signal elements $x_{k \in N_C(j):k \neq i}$ except for the target signal element $x_i$ which receives the probability information to be transferred. The probability information $m_{j \rightarrow i}^l$ to be transferred from the measurement signal element $z_j$ to the target signal element $x_i$ is expressed as shown in Equation 7. In this case, the sparse signal recovering device 200 can sets an initial value to $m_{j \rightarrow i}^{l=0}=1$, and uses the initial value in Equation 6. The probability information $m_{j \rightarrow i}^l$ represents probability information transferred from the $j^{th}$ measurement signal element to the $i^{th}$ target signal element in the $l^{th}$ exchange. In addition, $$\left[ p_Z(z_j | x_i, x_{k_1}, \ldots, x_{k_{L_1-1}}) \right]$$

represents statistical information of the measurement signal with a noise signal. In this case, the $L_j$ represents the number of 1s in the $j^{th}$ row of the sensing matrix. In addition, the $K_2^l$ is a constant used to normalize the probability information $m_{j \rightarrow i}^l$ in the $l^{th}$ exchange, and $\Sigma m_{j \rightarrow i}^l = 1$ is accomplished through the $K_2^l$, so that the probability information $m_{j \rightarrow i}^l$ becomes effective probability distribution. In following Equation 7, an operator ⊗ refers to circular convolution, and the circular convolution can be calculated through FFT (Fast Fourier Transform) as shown in FIG. 8.

$$\underline{m}_{j \to i}^l := K_2^l \times p_Z(z_j \mid x_i, x_{k_1}, \ldots, x_{k_{L_j}}) \otimes \underline{m}_{k_1 \to j}^l \otimes \underline{m}_{L_j \to j}^l \qquad \text{Equation 7}$$

$$(\underline{\alpha} \otimes \underline{\beta})_{N_{FFT}} = \text{FFT}(\underline{\alpha}) \times \text{FFT}(\underline{\beta})$$

If the exchange number l of times satisfies the present number $N_{iter}$ of times, the sparse signal recovering device 200 calculates the final posterior probability $p_X(x_i|\underline{c},\underline{z})$ based on the probability information $m_{j \to i}^{l=n_{iter}}$ of a measurement signal element obtained through the exchange and the prior probability of the target signal element (step S450). Referring to Equation 3, the final posterior probability $[p_X(x_i,\underline{c},\underline{z})]$ is obtained by multiplying the prior probability $p_X(x_i)$ of the target signal element $x_i$ by the likelihood probability $$\left[ \prod_{j \in N_V(i)} Pr(c_j, z_j \mid x_i) \right]$$

found based on the probability information $[m_{j \to i}^{l=n_{iter}} = Pr(c_j, z_j|x_i)]$ of the measurement signal elements $z_{j \in N_{V(i)}}$ related to the target signal $x_i$. Therefore, the sparse signal recovering device 200 can calculate the final posterior probability as shown in Equation 9. $K_3$ is a constant used to normalize the final posterior probability, and $\Sigma p_X(x_i|\underline{c},\underline{z})$ is accomplished through the $K_3$, so that the final posterior probability becomes effective probability distribution.

$$\begin{aligned} p_X(x_i \mid c, z) &= K_3 \times p_X(x_i) \times \prod_{j \in N_V(i)} Pr(c_j, z_j, \mid x_i) \\ &= K_3 \times p_X(x_i) \times \prod_{j \in N_V(i)} m_{j \to i}^{l=N_{iter}} \end{aligned} \qquad \text{Equation 9}$$

The sparse signal recovering device 200 recovers the target signal by performing the MAP estimation in such a manner that maximum final posterior probability can be obtained (step S460). The posterior probability distribution $[p_X(x_i|\underline{c},\underline{z})]$ of the target signal element $x_i$ is convergent on the distribution having the highest probability to obtain the real value of the target signal element $x_i$ through the iterative update procedure via the belief propagation.

Figure 5:
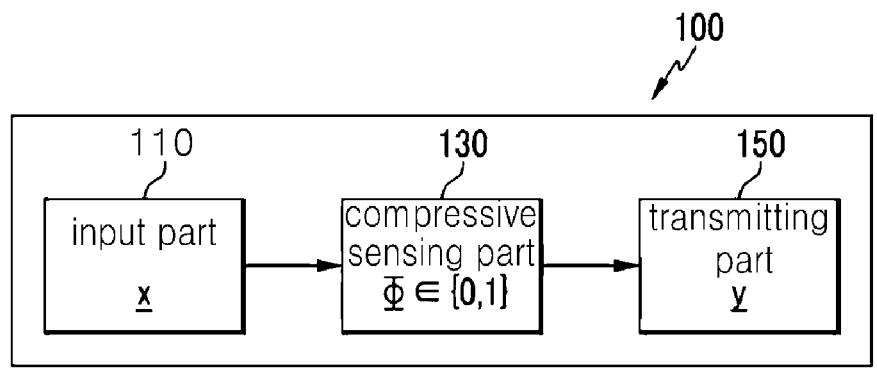
FIG. 5 is a block diagram showing a sparse signal transmitting device according to a first embodiment of the present invention.

FIG. 5 is a block diagram showing the sparse signal transmitting device 100 according to the first embodiment of the present invention.

Referring to FIG. 5, the sparse signal transmitting device 100 includes an input part 110, a compressive sensing part 130, and a transmitting part 150.

The input part 110 receives the target signal $\underline{x}$ to be compressed and transmitted. The target signal $\underline{x}$ is a sparse signal.

The compressive sensing part 130 senses and compresses the target signal based on the sensing matrix having zero elements and non-zero elements. The compressive sensing part 130 outputs the measurement signal $\underline{y} = \Phi\underline{x}$ generated by sensing and compressing the target signal $\underline{x}$ based on the sensing matrix $\Phi$ having the number M of rows smaller than the number N of columns.

The transmitting part 150 transmits the compressed signal.

Figure 6:
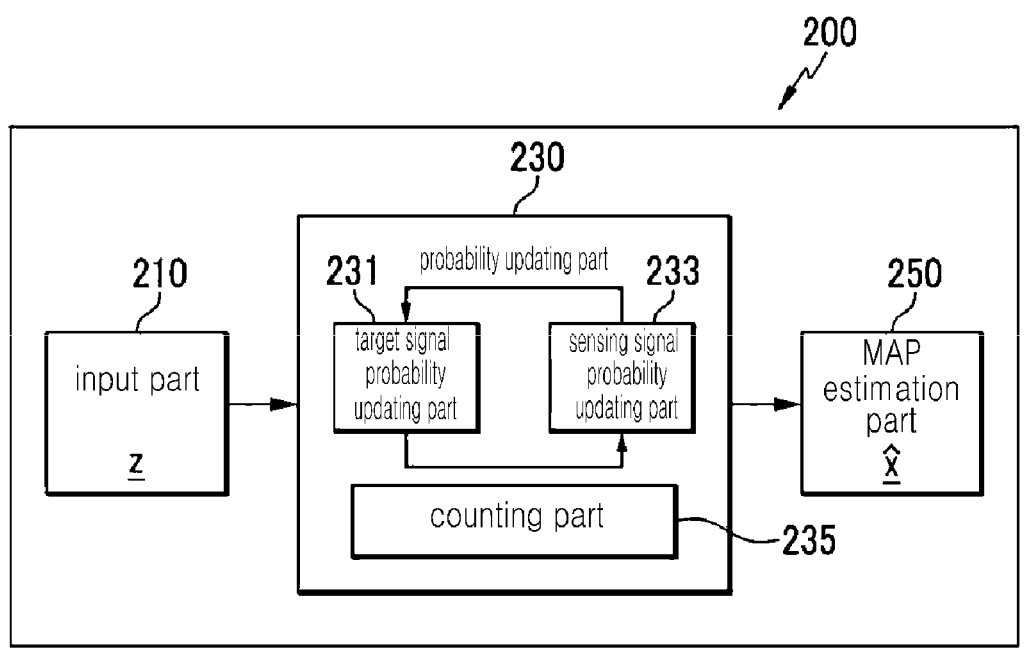
FIG. 6 is a block diagram showing a sparse signal recovering device according to a second embodiment of the present invention.

FIG. 6 is a block diagram showing the sparse signal recovering device 200 according to the first embodiment of the present invention.

Referring to FIG. 6, the sparse signal recovering device 200 includes an input part 210, a probability updating part 230, and a MAP estimation part 250. In this case, the probability updating part 230 includes a target signal probability updating part 231, a measurement signal probability updating part 233, and a counting part 235.

The input part 210 receives the signal $\underline{z}$ including the signal $\underline{y}$ generated by compressing and sensing the target signal $\underline{x}$. In other words, the input part 210 receives the measurement signal $\underline{z}$ with the noise signal $\underline{w}$, and the measurement signal $\underline{z}$ is generated by compressing and sensing the target signal $\underline{x}$ based on the sensing matrix. In this case, the measurement signal $\underline{z}$ received by the sparse signal recovering device 200 is a signal generated by adding the noise signal $\underline{w}$ to the real measurement signal $\underline{y}$ transmitted by the sparse signal transmitting device 100.

The probability updating part 230 updates the probability information of the target signal element and the probability information of the measurement signal element by exchanging the probability information of the target signal element with the probability information of the measurement signal element by the present number of times based on the relation between the target signal and the measurement signal. In order to perform the mutual update procedure, the probability updating part 230 includes the target signal probability updating part 231, the measurement signal probability updating part 233, and the counting part 235.

The target signal probability updating part 231 updates the probability information of the target signal element based on the probability information of the measurement signal element received from the measurement signal probability updating part 233. In addition, as shown in Equation 6, the target signal probability updating part 231 calculates the probability information $m_{i \to j}^l$ to be transferred to the measurement signal element related to the target signal element and transfers the probability information $m_{i \to j}^l$ to the measurement signal probability updating part 233.

The measurement signal probability updating part 233 updates the probability information of the measurement signal elements based on the probability information of the target signal element received from the target signal probability updating part 231. In addition, as shown in Equation 7, the measurement signal probability updating part 233 calculates the probability information $m_{i \to j}^l$ to be transferred to the target signal element related to the measurement signal element and transfers the probability information to the target signal probability updating part 231.

The counting part 235 checks the number l of times of exchanging probability between the target signal probability updating part 231 and the measurement signal probability updating part 233. The counting part 235 determines if the number l of times to exchange probability reaches the preset number $l = N_{iter}$ of times to control the probability information updating for each target signal element and each measurement signal element. In other words, the counting part 235 allows the probability exchange between the target signal probability updating part 231 and the measurement signal probability updating part 233 until the number l of times of exchanging probability reaches the preset number $N_{iter}$ of times ($l = N_{iter}$), and stops the probability update if the number l of times of exchanging probability reaches the preset number $N_{iter}$ of times ($l = N_{iter}$).

As shown in Equation 3, the MAP estimation part 250 calculates the final posterior probability of the target signal element based on the probability information of the measurement signal elements that is output as an update result, and the prior probability of the target signal element. In addition, as shown in Equation 1, the MAP estimation part 250 finds out an estimated target signal $\hat{\underline{x}}$ by performing the MAP estimation for the final posterior probability.

Since the sparse signal transmitting device 100 compresses a target signal based on the sensing matrix as described above, the sparse signal transmitting device 100 can be readily realized in hardware, and can rapidly sense and compress the target signal. In addition, the sparse signal recovering device 200 updates the probability related to the target signal and the probability related to the measurement signal by exchanging the probability related to the target signal with the probability related to the measurement signal via a belief propagation. Accordingly, the sparse signal recovering device 200 can calculate the highest final posterior probability to obtain the real target signal. In addition, since the MAP estimation is performed by using the final posterior probability, the success rate of the signal recovery can be increased. In addition, since the sparse signal recovering device 200 recovers the sparse target signal sensed based on the sensing matrix, the minimum length of the measurement signal required is gradually increased in recovery, so that low complexity is represented.

The first and second embodiments of the present invention have been described with reference to FIGS. 1 to 6 up to now.

Hereinafter, a third embodiment of the present invention will be described in detail with reference to FIGS. 7 to 14.

Figure 7:
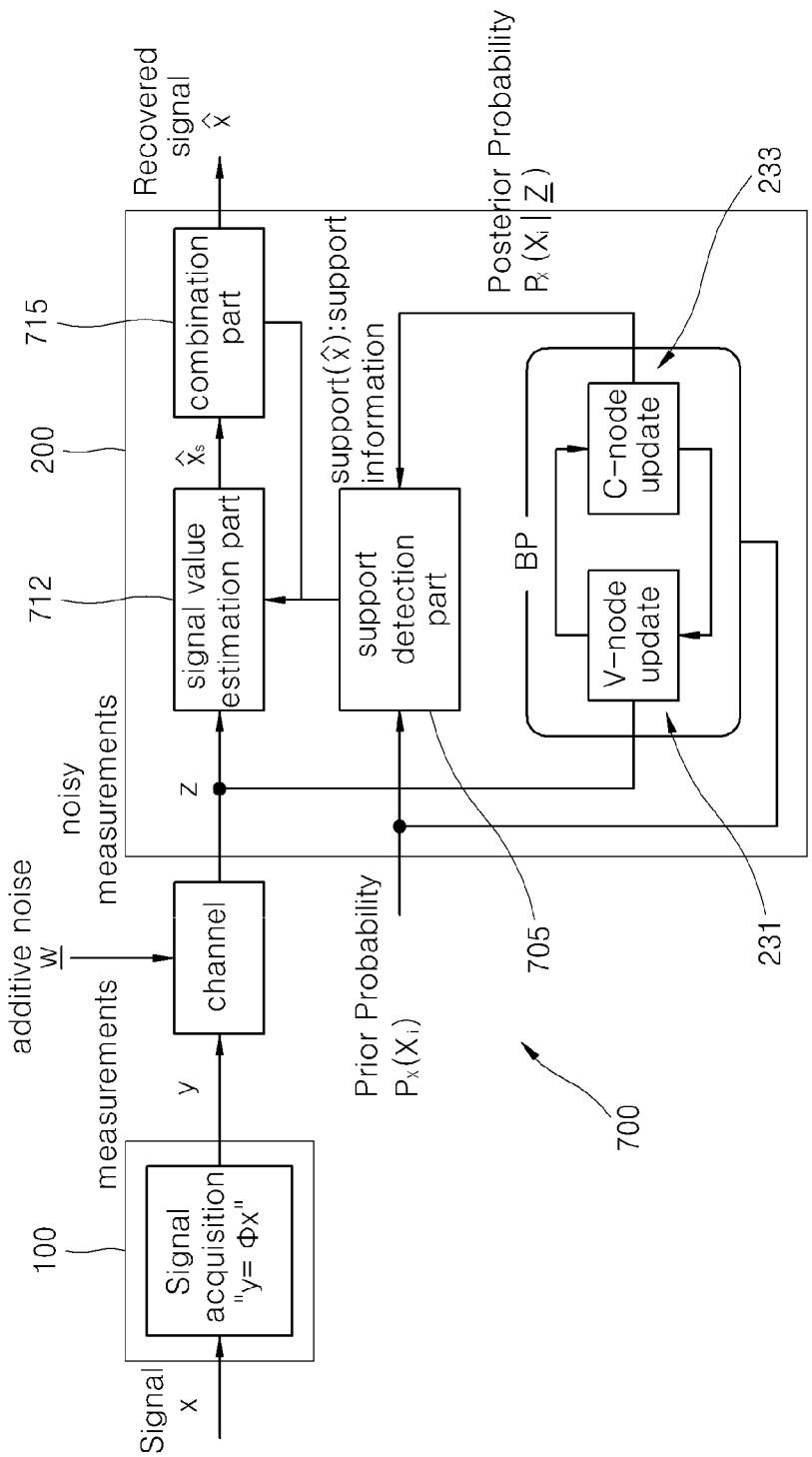
FIG. 7 is a block diagram showing a sparse signal recovering device according to a third embodiment of the present invention.

FIG. 7 shows a block diagram showing a sparse signal recovering device 700 according to the third embodiment of the present invention. Referring to FIG. 7, when comparing the structure of FIG. 6, a support detection part 705 serving as a Bayesian hypothesis test part, a signal value estimation part 712 serving as a minimum mean square error estimator (MMSE), and a combining part 715 are further included.

Through a sparse signal recovering algorithm applied to the sparse signal recovering device 700 according to the third embodiment of the present invention having the structure of FIG. 7, the recovering scheme of a target signal is defined through the MAP (Maximum a posterior) scheme in terms of probability, and the MAP scheme is performed by combination of the a signal support set detection part and a signal value estimation part, so that the signal can be recovered. In this case, a signal support set refers to a set of indexes of non-zero elements among signal elements.

Referring to FIG. 7, according to the third embodiment of the present invention, signal support set detection may be performed via a belief propagation and the support detection part 705 serving as a Bayesian hypothesis test part.

According to the third embodiment of the present invention, the posterior probability of a signal is calculated by iteratively calculating a likelihood probability and a prior probability under the assumption that the prior probability is recognized iva a belief propagation realized in a belief propagation part (231 or 232). Then, the signal support is detected through the Bayesian hypothesis teat based on the posterior probability. Thereafter, the signal value estimation part selects elements of a signal to be estimated based on the detected support information obtained in the prior part.

Thereafter, signal values of the selected elements are estimated by using the signal value estimation part 712 serving as the MMSE. Finally, the signal is recovered based on the information about the support set and the estimated signal values.

As described above, the third embodiment of the present invention has following effects. A signal can be recovered with low complexity. The signal can be recovered in terms of probability according to the sensing matrix and the sparsity of the target signal. The prior information about the target signal and the statistical information about noise are used as much as possible, so that a noise component can be removed from the signal component.

Hereinafter, the operation of the third embodiment according to the present invention will be described in more detail with reference to FIGS. 7 to 14.

3-1. Signal Measurement and Compression

According to the compressive sensing and recovering apparatus and method according to the third embodiment of the present invention shown in FIGS. 7 to 14, when the target signal $\underline{x} \in R^N$ is measured through a sensing matrix $\Phi$ having the sparsity, the target signal $\underline{x} \in R^N$ is effective. The sensing matrix $\Phi$ is a sparse matrix, and the generation of the sensing matrix $\Phi$ is as follows.

The number of elements having a value of "1" in the $j^{th}$ row of the sensing matrix $\Phi$ is fixed to $L_j$, and the position of a non-zero element is selected from among N positions in each row with the uniform probability of 1/N.

The measurement of the target signal $\underline{x} \in R^N$ is accomplished by projecting the target signal $\underline{x}$ to the above sensing matrix $\Phi \in R^{M \times N}$. In other words, $\Phi\underline{x}=\underline{y}(\in R^M)$. Therefore, the length of the result signal $\underline{y}$ satisfies M<N, the signal $\underline{y}$ includes compressed information about the signal $\underline{x}$. Therefore, through the sensing matrix $\Phi$, the target signal is simultaneously acquired and compressed.

3-2. Signal Recovering Algorithm

According to the apparatus and the method according to the third embodiment of the present invention shown in FIGS. 7 to 14, through a signal recovering algorithm via a belief propagation and Bayesian hypothesis test (BHT), the target signal is recovered from a measurement signal containing noise, which is expressed as $\underline{z}=\Phi\underline{x}+\underline{n}=\underline{y}+\underline{n}$. All symbols expressed in this clause follow symbols used in "3-1. Signal Measurement and Compression".

A signal $\underline{z}$ is a measurement signal generated by adding noise to the signal y.

Following information is used in the recovering method.

I. Measurement signal $\underline{z}$ with noise.

II. Statistical information for noise: $p_N(\underline{n})=\Pi_i p_N(n_i)$.

(probability information, $p_N(\underline{n})=\Pi_i p_N(n_i)$, is found from I and II)

III. Prior probability information $p_X(x_i)$ for $\underline{x}$

IV. Sensing matrix $\Phi$ used in signal compression.

Definitions are made as follows for the convenience of mathematical notations.

V: the total index set of $\underline{x}$, $V=\{1, 2, \ldots, N\}$,

C: the total index set of $\underline{y}$, $C=\{1, 2, \ldots, M\}$, $N_r(i):=\{\text{all } j \in C: \Phi_{ji}=1\} \subseteq C$, and $N_c:=\{\text{all } i \in V: \Phi_{ji}=1\} \subseteq V$, wherein, $\Phi_{ji}$ refers to the (j,i)th element of $\Phi$.

In addition, supp($\underline{x}$) refers to a signal support set, and is a sub-set of V.

A state $s_i$ represents a belonging state to the support set of each signal element.

1) If $s_i=1$, the signal element belongs to the support set, that is, $i \in \text{supp}(\underline{x})$.

2) If $s_i=0$, the signal element does not belong to the support set, that is, $i \notin \text{supp}(\underline{x})$.

3)

3.2.1 Signal Support Set Detection

The scheme of recovering a target signal is defined based on MAP estimation in terms of probability.

$$\hat{\underline{x}}=\text{argmax}_{\underline{x}}[p_X(\underline{x}|\underline{z})]s \cdot t \cdot \underline{z}=\Phi\underline{x}+\underline{n} \qquad \text{Equation 10}$$

According to the above equation, a signal $\underline{x}$ is recovered by estimating each signal element under the assumption that the elements of the signal $x_i$ are independent on each other.

$$\hat{x}_i=\text{argmax}_{\underline{x}_i}[p_X(\underline{x}_i|\underline{z})]s \cdot t \cdot \underline{z}=\Phi\underline{x}+\underline{n} \text{ for all } i \in V \qquad \text{Equation 11}$$

According to the third embodiment of the present invention, the signal is recovered through the approximation of Equation 11 to Equation 12.

$$\hat{x}_i \simeq \begin{cases} 0, & \frac{Pr(s_i = 0 \mid \underline{z})}{Pr(s_i = 1 \mid \underline{z})} \geq 1 \\ \operatorname{argmax}_{x_i} p_X(x_i \mid \underline{z}, s_i = 1), & \frac{Pr(s_i = 0 \mid \underline{z})}{Pr(s_i = 1 \mid \underline{z})} < 1 \end{cases} \text{ for all } i \in V \quad \text{Equation 12}$$

Equation 11 is analyzed as follows.
If $$\frac{Pr(s_i = 0 \mid \underline{z})}{Pr(s_i = 1 \mid \underline{z})} \geq 1,$$

it is determined that the corresponding signal element $x_j$ does not belong to the support set supp(x), so that the signal state is detected as $\hat{s}_i = 0$, and the value of the corresponding signal is estimated as $\hat{x}_i = 0$.

If $$\frac{Pr(s_i = 0 \mid \underline{z})}{Pr(s_i = 1 \mid \underline{z})} < 1,$$

it is determined that the corresponding signal element $x_j$ belongs to the support set supp(x), so that the signal state is detected as $\hat{s}_i = 1$ and the value of the corresponding signal is estimated as $\hat{x}_i \simeq \operatorname{argmax}_{x_i} p_X(x_i \mid \underline{z}, \underline{c}, s_i = 1)$.

3.2.1.1 State Detection of Signal Element Via Bayesian Hypothesis Test

The state detection is performed with respect to all signal elements $i \in V$. Before detecting the states of the signal elements, initialization $$\operatorname{supp}(\hat{\underline{x}}) = \emptyset$$

is performed. The state $s_i$ of each signal element is detected through Equation 13.

$$\begin{cases} \hat{s}_i = 1, & \text{if } T(i) < \gamma \\ \hat{s}_i = 0, & \text{if } T(i) \geq \gamma \end{cases} \text{ for all } i \in V \quad \text{Equation 13}$$

$$T(i) := \frac{Pr(s_i = 0 \mid \underline{z})}{Pr(s_i = 1 \mid \underline{z})} = \frac{\int \frac{p_X(x_i \mid s_i = 0)}{p_X(x_i)} p_X(x_i \mid \underline{z}) dx_i}{\int \frac{p_X(x_i \mid s_i = 1)}{p_X(x_i)} p_X(x_i \mid \underline{z}) dx_i}$$

In Equation 13, $\gamma \in [0,1]$ is one threshold value to detect the state of a signal element. The threshold value is determined based on the prior probability information of a signal. If the target signal has K non-zero elements and the length of N, the threshold value $\gamma$ is set as follows.

$$\gamma = \frac{K/N}{1 - K/N}$$

In order to calculate T(i), the prior probability information $p_X(x_i)$ and the posterior probability information $p_X(x_i \mid \underline{z})$ of each signal are required. In this case, $p_X(x_i)$, $p_X(x_i \mid s_i = 0)$, and $p_X(x_i \mid s_i = 1)$ are previously given. The $p_X(x_i \mid \underline{z})$ is calculated via the belief propagation. If the states $s_i$ of all elements of the signal $i \in V$ are detected through Equation 13, the support set supp($\hat{x}$) of the signal is updated through Equation 14.

$$\hat{s}_i = 1 \rightarrow \operatorname{supp}(\hat{\underline{x}}) = \operatorname{supp}(\hat{\underline{x}}) \cup \{i\}$$

$$\hat{s}_i = 0 \rightarrow i \not\subseteq \operatorname{supp}(\hat{\underline{x}}) \quad \text{Equation 14}$$

3.2.1.2 Finding of Posterior Probability via Belief Propagation

The posterior probability $p_X(x_i \mid \underline{z})$ used in the BHT is found through the belief propagation. The target probability $p_X(x_i \mid \underline{z})$ of Equation 10 shows that the posterior probability $p_X(x_i \mid \underline{z})$ is divided into the prior probability $p_X(\underline{x})$, the likelihood probability $p_r(\underline{c}, \underline{z} \mid \underline{x})$, and the evidence probability $p_r(\underline{c}, \underline{z})$ based on the Bayesian rule.

$$p_X(x_i \mid \underline{z}) \simeq p_X(x_i \mid \underline{z}, \underline{c}) = p_X(x_i) \times \frac{Pr(\underline{c}, \underline{z} \mid x_i)}{Pr(\underline{c}, \underline{z})} \quad \text{Equation 15}$$

$$= p_X(x_i) \times \frac{\prod_{j \in N_V(i)} Pr(c_j, z_j \mid x_i)}{Pr(\underline{c}, \underline{z})}$$

In Equation 15, a vector $\underline{c}$ is a vector to check if the constraint condition is satisfied with respect to a signal to be estimated, which is expressed as $\underline{c} = \Phi\underline{x} - \underline{z}$. Accordingly, as the number of times to repeat the algorithm is increased, the vector $\underline{c}$ approximates a noise vector $\underline{n}$. Therefore, the vector $\underline{c}$ is approximately independent on the signal $\underline{x}$, and $p_X(x_i \mid \underline{z}, \underline{c}) \simeq p_X(x_i \mid \underline{z})$ is accomplished. In Equation 15, $c_j : \Sigma_i \phi_{ji} x_i - (z_j + n_j) = 0$ for $j \in C$ is satisfied. In other words, $c_i \in \underline{c}$ is a constraint condition related to the $j^{th}$ element of the measurement signal.

Therefore, $Pr(c_j) = Pr(\Sigma_i \phi_{ji} x_i - (z_j + n_j) = 0)$ refers to a probability in which a constraint condition related to the $j^{th}$ element of the measurement signal is satisfied. This probability is referred to as a constraint probability of the $j^{th}$ element of the measurement signal.

In Equation 15, the likelihood probability $Pr(\underline{c}, \underline{z} \mid \underline{x})$ is expressed as a product of the constraint probabilities of elements of the measurement signal belonging to the set $N_V(i)$.

According to the belief propagation, in Equation 15, the posterior probability $P_X(x_i \mid \underline{z}, \underline{c})$ of the $i^{th}$ element of the target signal and the constraint probability $Pr(c_i, z_i \mid x_i)$ of the $j^{th}$ element of the measurement signal are iteratively found and updated.

During the repeated update through the belief propagation, the posterior probability $P_X(x_i \mid \underline{z}, \underline{c})$ is calculated by receiving probability information (constraint information) from the elements of the measurement signal belonging to the set $N_V(i)$.

At the $i^{th}$ element of the target signal, the probability information (posterior probability) to be transferred to one element $y_i$ belonging to the set $N_V(i)$ is calculated.

The probability information (posterior probability) transferred from the $i^{th}$ element of the target signal to the $i^{th}$ element $(j \in N_V(i))$ of the measurement signal during $l^{th}$ repetition is calculated as follows.

$$\underline{m}_{i \to j}^l := K^l \times p_X(x_i) \times \prod_{\kappa \subseteq N_V(i), \kappa \neq j} \underline{m}_{k \to i}^{l-1} \quad \text{Equation 16}$$

In Equation 16, the probability information $\underline{m}_{k \to i}^l$ refers to probability information (constraint probability) received from the $k^{th}$ element of the measurement signal during the $l^{th}$ repetition.

In Equation 16, $k^l$ is a constant used to normalize the probability information $m_{i \to j}^l$ during $l^{th}$ repetition. The constant $k^l$ is multiplied so that $\Sigma \underline{m}_{k \to i}^l = 1$ is accomplished. Accordingly, the becomes an effective probability distribution. In Equation 16, a symbol × refers to the multiplication of elements of a vector.

During the iterative updater based on the belief propagation, the probability information $\Pr(c_j, z_j | x_i)$ is calculated by receiving probability information (posterior probability) from elements of the target signal belonging to the set $N_C(j)$.

At the $j^{th}$ element of the measurement signal, the probability information (constraint probability) to be transferred to one element $x_1$ belonging to the set $N_C(j)$ is calculated.

During the $l^{th}$ repetition, the probability information (constraint probability) transferred from the $j^{th}$ element of the measurement signal to the $i^{th}$ element ($i \in (N_C(j))$ of the target signal is calculated as follows.

$$\underline{m}_{i \to j}^l = \delta(\tau - z_j) * p_N(n_j) * \underline{m}_{k_1 \to j}^l * \ldots * \underline{m}_{k_{L_1} \to j}^l \quad \text{Equation 17}$$

In Equation 16, $(\tau - z_j)$ is defined as follows.

$$\delta(\tau - z_j) = \begin{cases} 0 & \text{if } \tau \neq z_j \\ 1 & \text{if } \tau = z_j \end{cases}$$

In Equation 17, the $L_j$ refers to the number of works in the $j^{th}$ row of the sensing matrix $\Phi$. In Equation 17, $x_i, x_{k_i}, \ldots, x_{k_{i-1}} \in N_C(j)$. In Equation 17, the symbol "*" refers to a circular convolution operation, and the circular convolution is performed through FFT.

$$(\underline{\alpha} * \underline{\beta})_{N_{FFT}} = \text{FFT}(\underline{\alpha}) \times \text{FFT}(\underline{\beta}) \quad \text{Equation 18}$$

In Equation 17, an initialization value is set to $\underline{m}_{i \to j}^{l=0} = 1$. Equations 16 and 17 are calculated by the number $N_{iter}$ of times. Thereafter, the posterior probability distribution $p_X(x_i | \underline{z}, \underline{c}) \cong p_X(x_i | \underline{z})$ is finally calculated through Equation 13.

3.2.2 Estimation of Signal Value

Signal recovering is achieved as follows by using the information about the support set $\text{supp}(\underline{x})$ $$\underline{z} = \Phi \underline{x} + \underline{n} \to \underline{z} = \Phi_s \underline{x}_s + n \quad \text{Equation 19}$$

In Equation 19, $\underline{x}_s$ is one vector formed by using only elements of a signal belonging to $\text{supp}(\hat{\underline{x}})$. In addition, $\Phi_s$ is one sub-matrix of $\Phi$ formed by using only column vectors corresponding to indexes of elements belonging to $\text{supp}(\hat{\underline{x}})$. Since signal elements are independent on each other, the estimation of $x_s$ is achieved through the MAP estimation as described above.

$$\hat{\underline{x}}_s = \arg\max \prod_{i \in \text{supp}(\hat{\underline{x}})} p(x_i | \underline{z}, s_i = 1) \quad \text{Equation 20}$$

$$= \arg\max p(\underline{x}_s | \underline{z})$$

According to the third embodiment of the present invention, it is assumed that the signal value and the noise of each element follow normal distribution in Equation 20. Under the assumption, the MAP estimation defined in Equation 20 is identical to an MMSE (Minimum Mean Square Error) estimation. In addition, the MMSE estimation is expressed as Equation 22.

$$x_{i \in \text{supp}(\underline{x})} \sim N(0, \sigma_x^2), n_j \sim N(0, \sigma_n^2) \quad \text{Equation 21}$$

$$\hat{\underline{x}}_s = \left( \frac{1}{\sigma_x^2} I + \frac{1}{\sigma_n^2} \Phi_s^T \Phi_s \right)^{-1} \frac{1}{\sigma_n^2} \Phi_s^T \underline{z} \quad \text{Equation 22}$$

3.2.3 Combination of Signal Information

The detected support set $\text{supp}(\hat{x})$ and the signal value $\hat{\underline{x}}_s$ obtained through the MMSE estimation part are combined with each other to define a bijective mapping function $f: \text{supp}(\hat{\underline{x}}) \to U$ in order to recover the target signal. In this case, U is an index set corresponding to $\hat{\underline{x}}_s = [x_{s,1}, x_{s,2}, \ldots, x_{s,K}]$. K represents the magnitude of the support set, that is, $K := |\text{supp}(\hat{x})|$.

According to Equation 22, the elements of the target signal are recovered as follows.

$$\hat{x}_i = \begin{cases} \hat{x}_{s,f(i)}, & \text{if } i \in \text{supp}(\hat{\underline{x}}) \\ 0, & \text{if } i \notin \text{supp}(\hat{\underline{x}}) \end{cases} \quad \text{Equation 23}$$

for all $i \in V$

Although a preferred embodiment of the present invention has been described for illustrative purposes, those skilled in the art will appreciate that various modifications, additions and substitutions are possible, without departing from the scope and spirit of the invention as disclosed in the accompanying claims.

For example, a method and an apparatus for recovering a signal of the present invention are applicable to a signal having a complex value as well as a signal having a real value. In addition, although the embodiment of the present invention has been described in that the sensing matrix is a sparse matrix, the present invention is not limited thereto. In addition, those skilled in the art will comprehend that the present invention is applicable to a sensing matrix which is not a sparse matrix.

What is claimed is:

1. A method of transmitting a sparse signal in a sparse signal transmitting device, the method comprising:
    receiving a target signal transmitted by the sparse signal transmitting device that is based on an input signal, wherein the input signal is obtained by adding a noise signal to a measurement signal that is generated from the sparse signal transmitting device, and wherein the noise signal includes noise added in a wireless channel environment and quantization noise added in a quantization step;
    simultaneously sensing and compressing the target signal based on a sensing matrix consisting of a zero element and a non-zero element;

transferring a compressed signal to a sparse signal recovering device through a transmit channel, wherein the sensing matrix has a number of rows less than a number of columns, wherein the sparse signal recovering device configured to receive the compressed signal, update a posterior probability using a likelihood probability, and recover the target signal by performing a maximum a posterior estimation with respect to an updated posterior probability.

2. The method of claim 1, wherein, in the compressing of the target signal based on the sensing matrix consisting of the zero element and the non-zero element, the target signal is measured based on the sensing matrix, so that a measurement signal having a length shorter than a length of the target signal is output, and the sensing matrix includes a predetermined number of non-zero elements in each row.

3. A method for recovering a sparse signal by using a sparse signal recovering device that recovers a transmitted signal from a received signal, the method comprising:

receiving a measurement signal from a sparse signal transmitting device which measures a target signal based on a measurement matrix and then transmits the target signal;

performing a mutual update procedure in which a likelihood probability is calculated by using a posterior probability of the target signal based on a relation between the target signal and the measurement signal, and the posterior probability is updated by using the likelihood probability, in which noise is removed from a signal component by using prior information about the target signal and statistical information about noise; and recovering the target signal by performing maximum a posterior estimation for a final posterior probability obtained through the mutual update procedure, wherein, in the recovering of the target signal, a signal recovering scheme is defined in terms of probability based on the maximum a posterior estimation, the maximum a posterior estimation is performed by combination of a signal support set detection part and a signal value estimation part, and the signal support set detection part detects a support set of the signal via a belief propagation algorithm and a Bayesian hypothesis test.

4. The method of claim 3, further comprising:

detecting the support set of the signal based on the Bayesian hypothesis test by using the posterior probability;

selecting elements of a signal to be estimated based on information about the support set detected in the signal value estimation part;

estimating a signal value of each selected signal element by using a minimum mean square error estimator; and recovering a signal by combining the estimated signal value and the information about the support set, wherein, through Equation (a), the signal is estimated in a unit of the signal element, which is represented as $x_i$, in order to recover the signal under an assumption that elements of the target signal, which is represented as $\underline{x}$, are independent from each other, the signal is recovered by making Equation (a) approximate to Equation (b), a corresponding signal element, which is represented as $x_i$, is determined as being not contained in the support set, which is represented as $supp(x)$, so that a signal state is detected as zero, which is represented as $\hat{s}_i=0$, and a value of the corresponding signal is estimated as zero, which is represented as $\hat{x}_i=0$, if $$\frac{Pr(s_i=0|z)}{Pr(s_i=1|z)} \geq 1,$$

the corresponding signal element is determined as being contained in the support set, so that the signal state is detected as 1, which is represented as $\hat{s}_i=1$, and the value of the corresponding signal is estimated as $\hat{x}_i \cong \text{argmax}_{x_i} p_X(x_i|\underline{z},\underline{c},s_i=1)$ If $$\frac{Pr(s_i=0|z)}{Pr(s_i=1|z)} < 1,$$

states of all signal elements, which satisfy $i \in V$, are detected, the support set is initialized as $\phi$, which is represented as $supp(\underline{x})=\phi$, before the states of the signal elements are started, and the state of the signal element, which is represented as $s_i$, is detected through Equation (c), $$\hat{\underline{x}} \cong \text{argmax}_{\underline{z}}[p_X(\underline{x}|\underline{z})]s \cdot t \cdot \underline{z} = \Phi \underline{x} + \underline{n} \quad \text{Equation (a)}$$

$$\hat{x}_i = \text{argmax}_{x_i}[p_X(x_i|\underline{z})]s \cdot t \cdot \underline{z} = \Phi \underline{x} + \underline{n} \text{ for all } i \in V, \text{ and} \quad \text{Equation (b)}$$

$$\begin{cases} \hat{s}_i = 1, & \text{if } T(i) < \gamma \\ \hat{s}_i = 0, & \text{if } T(i) \geq \gamma \end{cases} \quad \text{Equation (c)}$$

for all $i \in V$ $$T(i) := \frac{Pr(s_i=0|z)}{Pr(s_i=1|z)} = \frac{\int \frac{p_X(x_i|s_i=0)}{p_X(x_i)} p_X(x_i|z)dx_i}{\int \frac{p_X(x_i|s_i=1)}{p_X(x_i)} p_X(x_i|z)dx_i}.$$

5. The method of claim 4, wherein, in Equation (c), $\gamma \in [0,1]$ represents one threshold value used to detect the state of the signal element, the threshold value is determined based on the information about the priory probability information of the signal, if the target signal has K non-zero elements and a length of N, the threshold value is determined as $$\gamma = \frac{K/N}{1-K/N},$$

$p_X(x_i)$ representing the information about the prior probability and $p_X(x_i|\underline{z})$ representing a posterior probability of each signal are required to calculate $T(i)$ the $p_X(x_i)$, $p_X(x_i|s_i=0)$, and $p_X(x_i|s_i=1)$ are previously given, the $p_X(x_i|\underline{z})$ is found via the belief propagation, the support set of the signal is updated as Equation (d) when the states of all signal elements satisfying $i \in V$ are detected through Equation (c), $$\hat{s}_i=1 \rightarrow supp(\hat{\underline{x}})=supp(\hat{\underline{x}}) \cup \{i\}$$

$$\hat{s}_i=0 \rightarrow i \notin supp(\hat{\underline{x}}) \quad \text{Equation (d)}$$

signal recovering is achieved through Equation (e) by using information about the support set of the signal obtained in the support set detection part, $$\underline{z}=\phi \underline{x}+\underline{n} \rightarrow \underline{z}=\Phi_s \underline{x}_s+\underline{n}, \quad \text{Equation (e)}$$

in which $\underline{x}_s$ represents one vector including only signal elements contained in the support set, $\Phi_s$ represents one sub-vector of $\Phi$ including only column vectors corresponding to indexes of the signal elements contained in the support set, estimation of the $\underline{x}_s$ is defined through the maximum a posterior estimation since the signal elements are independent on each other as shown in Equation (f), $$\hat{x}_s = \arg\max \prod_{i \in supp(\hat{x})} p(x_i | z, s_i = 1) \qquad \text{Equation (f)}$$
$$= \arg\max p(\underline{x}_s | z),$$

the minimum mean square error estimation is performed as expressed in Equation (h) under an assumption that the signal value of each signal element and the noise follow normal distribution, which expressed in Equation (g), in Equation (f), $$x_{i \in supp(\underline{x})} \sim N(0, \sigma_x^2), n_j \sim N(0, \sigma_n^2) \qquad \text{Equation (g)}$$

$$\hat{\underline{x}}_s = \left(\frac{1}{\sigma_x^2} I + \frac{1}{\sigma_n^2} \Phi_s^T \Phi_s\right)^{-1} \frac{1}{\sigma_n^2} \Phi_s^T z, \qquad \text{Equation (h)}$$

the supp($\hat{x}$), which represents the detected support set, and the $\hat{\underline{x}}_s$, which represents the signal value found by an MMSE estimator, are combined with each other to define $f$:supp($\hat{x}$)→U, which represents a bijective mapping function, in which U represents an index set corresponding to $\hat{\underline{x}}_s = [x_{s,1}, x_{s,2}, \ldots, x_{s,K}]$, and K represents a magnitude of the support set and is expressed as K:=|supp($\hat{x}$)|, and each element of the target signal is recovered through Equation (i), $$\hat{x}_i = \begin{cases} \hat{x}_{s,f(i)}, & \text{if } i \in supp(\hat{x}) \\ 0, & \text{if } i \notin supp(\hat{x}) \end{cases} \qquad \text{Equation (i)}$$

for all $i \notin V$.

6. The method of claim 5, wherein, in the performing of the mutual update procedure, the mutual update procedure is iterated by a predetermined number of times, so that the posterior probability of the target signal is calculated, the relation between the target signal and the measurement signal is set based on the measurement matrix, probability information corresponding to the target signal is exchanged with probability information corresponding to the measurement signal related to the target signal, the relation between the target signal and the measurement signal, which is generated by adding the noise to a signal transmitted from the sparse signal transmitting device, is set as a constraint condition, the likelihood probability satisfying the constraint condition is calculated, constraint probabilities, in which a plurality of measurement signal elements related to the target signal satisfy an appropriate condition of the constraint condition, are calculated, the likelihood probability is calculated by multiplying the constraint probabilities together, the final posterior probability is calculated based on a prior probability of the target signal and the likelihood probability output as a result of the mutual update procedure, and a signal having a highest probability value among final posterior probabilities is determined as the target signal in the recovering of the target signal.

7. A method for recovering a sparse signal by using a sparse signal recovering device that recovers a target signal from a measurement signal with a noise signal, the method comprising:

exchanging probability information of target signal elements with probability information of measurement signal elements related to the target signal elements by a predetermined number of times to update the probability information of the target and measurement signal elements;

calculating final posterior probabilities based on the probability information of the measurement signal elements acquired from an exchange result and prior probabilities of the target signal elements; and recovering the target signal through maximum a posterior estimation in such a manner that a maximum final posterior probability is obtained, wherein, in the recovering of the target signal, a signal recovering scheme is defined in terms of probability based on the maximum a posterior estimation, the maximum a posterior estimation is performed by combination of a signal support set detection part and a signal value estimation part, noise is removed from a signal component by using prior information about the target signal and statistical information about the noise, and the signal support set detection part detects a support set of the signal via a belief propagation and a Bayesian hypothesis test.

8. The method of claim 7, further comprising:

detecting the support set of the signal based on the Bayesian hypothesis test by using the posterior probability;

selecting elements of a signal to be estimated based on information about the support set detected in the signal value estimation part;

estimating a signal value of each selected signal element by using a minimum mean square error estimator; and recovering a signal by combining the estimated signal value and the information about the support set, wherein, through Equation (a), the signal is estimated in a unit of the signal element, which is represented as $x_i$, in order to recover the signal under an assumption that elements of the target signal, which is represented as $\underline{x}$, are independent on each other, the signal is recovered by making Equation (a) approximate to Equation (b), a corresponding signal element, which is represented as $x_i$, is determined as being not contained in the support set, which is represented as supp(x), so that a signal state is detected as zero, which is represented as $\hat{s}_i = 0$, and a value of the corresponding signal is estimated as zero, which is represented as $\hat{x} = 0$, if $$\frac{Pr(s_i = 0 | z)}{Pr(s_i = 1 | z)} \geq 1,$$

the corresponding signal element is determined as being contained in the support set, so that the signal state is detected as 1, which is represented as $\hat{s}_i = 1$, and the value of the corresponding signal is estimated as $\hat{x}_i \triangleq \mathrm{argmax}_{x_i} p_X(x_i|\underline{z},\underline{c},s_i=1)$ If $$\frac{Pr(s_i=0|\underline{z})}{Pr(s_i=1|\underline{z})} < 1,$$

states of all signal elements, which satisfy $i \in V$, are detected, the support set is initialized as $\phi$, which is represented as supp $(\hat{x})=\phi$, before the states of the signal elements are started, the state of the signal element, which is represented as $s_i$, is detected through Equation (c), $$\hat{\underline{x}} \triangleq \mathrm{argmax}_{\underline{x}}[p_X(\underline{x}|\underline{z})]s\cdot t\cdot \underline{z}=\Phi\underline{x}+\underline{n} \quad \text{Equation (a)}$$

$$\hat{x}_i = \mathrm{argmax}_{x_i}[p_X(x_i|\underline{z})]s\cdot t\cdot \underline{z}=\Phi\underline{x}+\underline{n} \text{ for all } i \in V, \text{ and} \quad \text{Equation (b)}$$

$$\begin{cases} \hat{s}_i = 1, & \text{if } T(i) < \gamma \\ \hat{s}_i = 0, & \text{if } T(i) \geq \gamma \end{cases} \quad \text{Equation (c)}$$

for all $i \in V$ $$T(i) := \frac{Pr(s_i=0|z)}{Pr(s_i=1|z)} = \frac{\int \frac{p_X(x_i|s_i=0)}{p_X(x_i)} p_X(x_i|z) dx_i}{\int \frac{p_X(x_i|s_i=1)}{p_X(x_i)} p_X(x_i|z) dx_i}$$

$\gamma \in [0,1]$ represents one threshold value used to detect the state of the signal element in Equation (c), the threshold value is determined based on the information about the priory probability information of the signal, if the target signal has K non-zero elements and a length of N, the threshold value is determined as $$\gamma = \frac{K/N}{1-K/N},$$

$p_X(x_i)$ representing the information about the prior probability and $p_X(x_i|\underline{z})$ representing a posterior probability of each signal are required to calculate $T(i)$ the $p_X(x_i)$, $p_X(x_i|s_i=0)$, and $p_X(x_i|s_i=1)$ are previously given, the $p_X(x_i|\underline{z})$ is found via the belief propagation, the support set of the signal is updated as Equation (d) when the states of all signal elements satisfying $i \in V$ are detected through Equation (c), $$\hat{S}_i=1 \rightarrow \mathrm{supp}(\hat{\underline{x}})=\mathrm{supp}(\hat{\underline{x}}) \cup \{i\}$$

$$\hat{S}_i=0 \rightarrow i \notin \mathrm{supp}(\hat{\underline{x}}) \quad \text{Equation (d)}$$

signal recovering is reduced through Equation (e) by using information about the support set of the signal obtained in the support set detection part, $$\underline{z}=\phi\underline{x}+\underline{n} \rightarrow \underline{z}=\Phi_s\underline{x}_s+\underline{n}, \quad \text{Equation (e)}$$

in which $\underline{x}_s$ represents one vector including only signal elements contained in the support set, $\Phi_s$ represents one sub-vector of $\Phi$ including only column vectors corresponding to indexes of the signal elements contained in the support set, estimation of the $\underline{x}_s$ is defined through the maximum a posterior estimation since the signal elements are independent on each other as shown in Equation (f), $$\hat{\underline{x}}_s = \mathrm{argmax} \prod_{i \in \mathrm{supp}(\hat{x})} p(x_i|z, s_i=1) \quad \text{Equation (f)}$$

$$= \mathrm{argmax}\, p(x_s|z),$$

the minimum mean square error estimation is performed as expressed in Equation (h) under an assumption that the signal value of each signal element and the noise follow normal distribution, which expressed in Equation (g), in Equation (f), $$x_{i \in \mathrm{supp}(\underline{x})} \sim N(0, \sigma_x^2), n_j \sim N(0, \sigma_n^2) \quad \text{Equation (g),}$$

$$\hat{\underline{x}}_s = \left(\frac{1}{\sigma_x^2} I + \frac{1}{\sigma_n^2} \Phi_s^T \Phi_s\right)^{-1} \frac{1}{\sigma_n^2} \Phi_s^T z, \quad \text{Equation (h)}$$

the supp($\hat{x}$), which represents the detected support set, and the $\hat{\underline{x}}_s$, which represents the signal value found by an MMSE estimator, are combined with each other to define $f:\mathrm{supp}(\hat{\underline{x}}) \rightarrow U$, which represents a bijective mapping function, in which U represents an index set corresponding to $\hat{\underline{x}}_s=[x_{s,1}, x_{s,2}, \ldots, x_{s,K}]$, and K represents a magnitude of the support set and is expressed as $K:=|\mathrm{supp}(\hat{x})|$, and each element of the target signal is recovered through Equation (i), $$\hat{x}_i = \begin{cases} \hat{x}_{s,f(i)}, & \text{if } i \in \mathrm{supp}(\hat{\underline{x}}) \\ 0, & \text{if } i \notin \mathrm{supp}(\hat{\underline{x}}) \end{cases} \quad \text{Equation (i)}$$

for all $i \notin V$.

9. The method of claim 7, wherein, in the updating of the probability information, a procedure, in which the probability information of the target signal elements is updated based on the probability information of the measurement signal elements related to the target signal elements, the probability information of the measurement signal elements is updated based on the probability information of the target signal elements related to the measurement signal elements, is iterated by a predetermined number of times, first probability information to be transferred from a first target signal element to a plurality of measurement signal elements related to the first target signal element is calculated based on probability information obtained from the measurement signal elements related to the first target element, second probability information to be applied to a plurality of target signal elements related to a first measurement signal element from the first measurement signal element is calculated based on probability information of the measurement signal elements related to the first measurement element, and a mutual update procedure is iterated while determining if a number of times of exchanging the probability information of the related target and measurement signal elements satisfies the predetermined number of times while exchanging the probability information of the related target and measurement signal elements.

10. The method of claim 9, wherein the calculating of the first probability information to be transferred to the measurement signal elements related to the first target signal element comprises:
calculating a first value by multiplying the probability information received from remaining measurement signal elements obtained by excluding the measurement signal element of the first probability information to be transferred from the measurement signal elements related to the first target signal element;
calculating a second value by multiplying the first value by a prior probability of the first target signal element; and
calculating the first probability information by normalizing the second value.

11. The method of claim 9, wherein the calculating of the second probability information to be transferred to the target signal elements related to the first measurement signal element comprises:
calculating a first value by performing circular convolution with respect to the probability information received from remaining target signal elements obtained by excluding the target signal element of the second probability information to be transferred from the measurement signal elements related to the first measurement signal element;
calculating a second value by performing circular convolution with respect to the first value and statistical information of the measurement signal with the noise signal; and
calculating the second probability information by normalizing the second value.

12. The method of claim 11, wherein the circular convention is preformed through Fast Fourier Transform.

13. The method of claim 7, wherein, in the updating of the probability information of the target and measurement signal elements, a relation between the target signal elements and the measurement signal elements is determined based on a binary measurement matrix used to compress the target signal to the measurement signal.

14. The method of claim 7, wherein, in the calculating of the final posterior probabilities, likelihood probabilities are calculated by multiplying probability information of measurement signal elements related to the target signal, and the final posterior probabilities are calculated based on the likelihood probabilities and the prior probabilities.

15. The method of claim 9, wherein the probability information of the target signal elements is posterior probability information of the target signal elements, and the probability information of the measurement signal elements is likelihood probability information related to the posterior probabilities of the target signal elements.

16. The method of claim 15, wherein the probability information of the measurement signal elements includes constraint probabilities of the measurement signal elements satisfying a constraint condition, and the constraint condition is a relation between the target signal and a received signal obtained by adding the noise signal to the measurement signal.

17. An apparatus for transmitting a sparse signal, which compresses a sparse target signal and transmits the sparse target signal, the apparatus comprising:
an input part configured to receive both a real measurement signal transmitted by the apparatus for transmitting a sparse signal and a noise signal including received noise added in a wireless channel environment and quantization noise added in a quantization step;
a compressive sensing part configured to simultaneously measure and compress the sparse target signal based on a sensing matrix having a zero element and a non-zero element and configured to generate a measurement signal; and
a transmitting part configured to transmit a compressed signal to a sparse signal recovering device through a transmit channel,
wherein the sparse signal recovering device configured to receive the compressed signal, update a posterior probability using a likelihood probability, and recover the target signal by performing a maximum a posterior estimation with respect to an updated posterior probability.

18. The apparatus of claim 17, wherein the compressive sensing part outputs a measurement signal obtained by sensing and compressing the sparse target signal by using the sensing matrix having a number of rows less than a number of columns.

19. An apparatus for recovering a sparse signal which recovers a target signal from a received signal, the apparatus comprising:
an input part to receive a signal including a measurement signal obtained by compressive-measurement the target signal;
a probability updating part to update probability information of the target signal elements and probability information of the measurement signal elements by exchanging the probability information of the target signal elements with the probability information of the measurement signal elements by a predetermined number of times based on a relation between the target signal and the measurement signal;
a maximum a posterior (MAP) estimation part to calculate final posterior probabilities of the target signal elements based on probability information of the measurement signal elements that is output as an update result, and prior probabilities of the target signal elements, and to recover the target signal by performing maximum a posterior estimation for the final posterior probabilities;
a Bayesian hypothesis test part to detect a signal support set through a Bayesian hypothesis test by using the posterior probabilities to select elements of a signal to be estimated based on information about the detected signal support set;
a minimum mean square error estimator to estimate signal values of the selected elements; and
a combination part to recover a signal by combining the information about the support set and the estimated signal values,
wherein, noise is removed from a signal component by using prior information about the target signal and statistical information about the noise.

20. The apparatus of claim 19, wherein the input part receives a measurement signal obtained by compressive-sensing the target signal based on a sensing matrix.

21. The apparatus of claim 19, wherein the probability updating part comprises:
a target signal probability updating part to update the probability information of the target signal element based on received probability information of the measurement signal element, and to calculate probability information to be transferred to a measurement signal element related to the target signal element;
a measurement signal probability updating part to update the probability information of the measurement signal element based on the probability information received from the target signal probability updating part, and to calculate probability information to be transferred to a target signal element related to the measurement signal element, so that the probability information is transferred to the target signal probability updating part; and a counting part to calculate a number of times of exchanging probabilities between the target signal probability updating part and the measurement signal probability updating part, and to determine if the number of times of exchanging the probabilities reaches the predetermined number of times, so that updating for the probability information of the target and measurement signal elements is controlled.

22. The apparatus of claim 21, wherein the probability information of the target signal elements is posterior probability information of the target signal elements, and the probability information of the measurement signal elements is likelihood probability information related to posterior probabilities of the target signal elements.

23. The apparatus of claim 19, wherein the maximum a posterior estimation part calculates likelihood probabilities by multiplying the probability information of the measurement signal elements related to the target signal, which is output as the update result, and the final posterior probabilities are calculated based on the likelihood probabilities and the prior probabilities.

* * * * *